(12) United States Patent
Fritzsche et al.

(10) Patent No.: US 8,438,533 B2
(45) Date of Patent: May 7, 2013

(54) PERFORMANCE-RELATED DECISION SUPPORT FOR COMPOSITIONS OF PROCESS MODELING ENVIRONMENTS

(75) Inventors: Mathias Fritzsche, Belfast (GB); Wasif Gilani, Belfast (GB)

(73) Assignee: SAG AG, Walldorf (DE)

( * ) Notice: Subject to any disclaimer, the term of this patent is extended or adjusted under 35 U.S.C. 154(b) by 413 days.

(21) Appl. No.: 12/767,272

(22) Filed: Apr. 26, 2010

(65) Prior Publication Data

US 2011/0265060 A1 Oct. 27, 2011

(51) Int. Cl.
*G06F 9/44* (2006.01)

(52) U.S. Cl.
USPC .......................... 717/104; 717/105; 717/126

(58) Field of Classification Search .................. None
See application file for complete search history.

(56) References Cited

U.S. PATENT DOCUMENTS

| | | | |
|---|---|---|---|
| 5,590,330 A * | 12/1996 | Coskun et al. ............... | 717/126 |
| 6,925,632 B2 * | 8/2005 | Shiu ............................ | 717/104 |
| 7,096,454 B2 * | 8/2006 | Damm et al. ................ | 717/105 |
| 7,596,778 B2 * | 9/2009 | Kolawa et al. .............. | 717/126 |
| 7,926,024 B2 * | 4/2011 | Clarke ......................... | 717/104 |
| 8,145,468 B2 * | 3/2012 | Fritzsche et al. ............. | 703/22 |
| 8,276,112 B2 * | 9/2012 | Fritzsche et al. ............ | 717/104 |
| 2002/0129329 A1 * | 9/2002 | Nishioka et al. ............ | 717/104 |
| 2002/0129330 A1 * | 9/2002 | Shiu ........................... | 717/104 |
| 2005/0080609 A1 * | 4/2005 | Bhaskaran et al. ........... | 703/22 |
| 2006/0005170 A1 * | 1/2006 | Rosaria et al. .............. | 717/126 |
| 2006/0168558 A1 * | 7/2006 | de Seabra e Melo et al. | 717/105 |
| 2008/0120593 A1 * | 5/2008 | Keren et al. ................. | 717/105 |
| 2008/0163164 A1 * | 7/2008 | Chowdhary et al. ......... | 717/106 |
| 2008/0313596 A1 * | 12/2008 | Kreamer et al. ............. | 717/101 |
| 2009/0113380 A1 * | 4/2009 | Ploesser et al. ............. | 717/104 |
| 2009/0132562 A1 | 5/2009 | Mehr et al. | |
| 2009/0132959 A1 * | 5/2009 | Shanmugasundaram et al. ............................ | 707/102 |
| 2009/0171720 A1 | 7/2009 | Crook et al. | |

(Continued)

FOREIGN PATENT DOCUMENTS

EP 2065799 A1 * 6/2009

OTHER PUBLICATIONS

Amit Chhabra et al., "Analysis & Integrated Modeling of the Performance Evaluation Techniques for Evaluating Parallel Systems", International Journal of Computer Science and Security, Oct. 2007, <https://www.google.com/search?q=performance+models+to+evaluate+development+models> pp. 1-10.*

(Continued)

*Primary Examiner* — Thuy Dao
*Assistant Examiner* — Samuel Hayim
(74) *Attorney, Agent, or Firm* — Brake Hughes Bellermann LLP

(57) ABSTRACT

Multiple development models of software applications utilizing different service environments may be annotated with additional information and transformed within a transformation chain into a resulting unified performance analysis model that may be used to evaluate the development models, for example, for simulations and/or analytical sensitivity analysis by utilizing different performance analysis environments. By relating elements of the development models through the transformation chain to elements of resulting unified models, the evaluation may be performed with respect to the resulting/transformed model, but provided to a user in terms of the original development models. In this way, a user of the development models may work with the more-familiar development models, utilizing multiple different performance analysis tools, without having to alter the development models directly in order to obtain the evaluation.

20 Claims, 10 Drawing Sheets

U.S. PATENT DOCUMENTS

2009/0249281 A1 10/2009 Fritzsche et al.
2010/0083212 A1 4/2010 Fritzsche et al.
2010/0324869 A1* 12/2010 Cherkasova et al. .............. 703/2

OTHER PUBLICATIONS

Aldo Dagnino et al., "A Model to Evaluate the Economic Benefits of Software Components Development", IEEE, 2003, <http://ieeexplore.ieee.org/stamp/stamp.jsp?tp=&arnumber=1244479> pp. 3792-3797.*
Hemant Jain et al., "An Assessment Model for Requirements Identification in Component-Based Software Development", ACM, 2003, <http://delivery.acm.org/10.1145/960000/957765/p48-jain.pdf> pp. 48-63.*
Silver, Bruce, "The BPMS Report: EMC Documentum Process Suite 6.0", Bruce Silver Associates, 2008, 34 pages.
"Why AnyLogic?", XJ Technologies Simulation Software and Services, XJ Technologies Company 1992-2009, 1 page.
Rogers, Paul, "Optimum-Seeking Simulation in the Design and Control of Manufacturing Systems: Experience with Optquest for Arena", Proceedings of the 2002 Winter Simulation Conference, 2002, pp. 1142-1150.
Franks, Gregory R., "Performance Analysis of Distributed Server Systems", Dissertation, Carleton University, Ottawa, Ontario, Canada, Dec. 20, 1999, 294 pages.
Fritzsche, Mathias et al., "Putting Performance Engineering into Model-Driven Engineering: Model-Driven Performance Engineering", Lecture Notes in Computer Science, vol. 5002, 2008, pp. 77-87.
"JCOM", Retrieved from http://www.jcom1.com/, 2008, 2 pages.
Fritzsche, Mathias et al., "Towards Utilizing Model-Driven Engineering of Composite Applications for Business Performance Analysis", Proceedings of the 4th European conference on Model Driven Architecture: Foundations and Applications, Lecture Notes in Computer Science, vol. 5095, 2008, 12 pages.
"Business Process Model and Notation (BPMN): Version 1.2", Final Adopted Specification, Object Management Group, Jan. 3, 2009, 316 pages.
Snabe, J.H., et al, "Enabling Technologies for BPM", Business Process Management: The SAP Roadmap, SAP Press, 2008, pp. 65-82.
Fritzsche, Mathias et al., "Application of Tracing Techniques in Model-Driven Performance Engineering", In the Proceedings of 4th ECMDA Traceability Workshop, 2008, pp. 111-120.
Petriu, Dorin B. et al., "An Intermediate Metamodel with Scenarios and Resources for Generating Performance Models from UML Designs", Software and Systems Modeling, vol. 6, No. 2, 2007, pp. 163-184.

U.S. Appl. No. 12/239,713, filed Sep. 26, 2008, 62 pages.
Fritzsche, Mathias et al., "Systematic Usage of Embedded Modelling Languages in Model Transformation Chains", Software Language Engineering, Lecture Notes in Computer Science, vol. 5452, 2009, pp. 134-150.
Fritzsche, Mathias et al., "Applying Megamodelling to Model Driven Performance Engineering", Proceedings of the 16th Annual IEEE International Conference and Workshop on the Engineering of Computer Based Systems, 2009, pp. 244-253.
Barbero, Mikael et al., "Model Driven Management of Complex Systems: Implementing the Macroscope's Vision", 15th Annual IEEE International Conference and Workshop on the Engineering of Computer Based Systems, 2008, pp. 277-286.
Brown, Aaron. B. et al., "A Model of Configuration Complexity and its Application to a Change Management System", in Proceedings of the 9th International IFIP/IEEE Symposium on Integrated Management, May 2005, 14 pages.
Fritzsche, Mathias et al., "Model Transformation Chains in Model-Driven Performance Engineering: Experiences and Future Research Needs", 2010, pp. 213-220.
Fritzsche, Mathias et al., "Guided Uncertainty Reduction in Automatically Generated Business Simulations", First International Conference on Advances in System Simulation, 2009, pp. 106-111.
Silver, Bruce, "The BPMS Report: TIBCO iProcess Suite 10.6", Bruce Silver Associates, 2007, 30 pages.
Harmon, Paul, et al., "The State of Business Process Management", A BPT Report, BPTrends, Feb. 2008, 54 pages.
Woodside, Murray et al., "Performance by Unified Model Analysis (PUMA)", ACM Workshop on Software and Performance, Jul. 11-15, 2005, pp. 1-12.
"OWL-S: Semantic Markup for Web Services", The OWL Services Coalition, Retrieved on May 5, 2010 from http://www.daml.org/services/owl-s/1.0/owl-s.html, 27 pages.
Fritzsche, Mathias et al., "MDE in a Sales Management System: A Case Study", 2008 INRIA, TUD & SAP, 19 pages.
Vanhooff, Bert et al., "Towards a Transformation Chain Modeling Language", Proceedings of the 6th International Workshop on Embedded Computer Systems: Architectures, Modeling, and Simulation, 2006, pp. 39-48.
Fritzsche, Mathias et al., "MDPE Workbench—A Solution for Performance related Decision Support", 2008, 5 pages.
Fritzsche, Mathias et al., "Extending BPM Environments of Your Choice with Performance Related Decision Support", Lecture Notes in Computer Science, vol. 5701, 2009, pp. 97-112.

* cited by examiner

PERFORMANCE-RELATED DECISION SUPPORT FOR COMPOSITIONS OF PROCESS MODELING ENVIRONMENTS

TECHNICAL FIELD

This description relates to model-based processes.

BACKGROUND

Many businesses and organizations may utilize multiple services (e.g., software applications) that may be provided by different vendors. These services may be utilized in various ways, and may need to be executed concurrently, or as end-to-end processes. For example, a business may utilize a customer ordering service that may be utilized as an end-to-end service with a customer invoicing and billing service. For example, the customer ordering service may be supplied by a vendor that is different from a vendor supplying the customer invoicing and billing service, and the two services may be executed in different service environments, providing a composition of service environments. Further, a user may wish to utilize one or more customized services to be included in the end-to-end execution of other services.

Model-driven engineering and related concepts relate, for example, to the use of formalized models to design, manage, implement, and modify software applications and other processes. Such models provide a formalized abstraction of desired software properties and behaviors, and this abstraction provides, among other benefits, an ability of a designer or other user to understand, explain, create, or implement the software application(s) in a manner that is consistent, logical, and efficient. In theory, then, such development models may be modified as-needed to obtain a desired result. At times, however, it may be useful or desirable to use a development model that (in whole or in part) should not, or must not, be modified. For example, a developer may use a development model that is vendor-specific/vendor-confidential in whole or in part, and therefore the developer may not have the necessary levels of access to modify the development model. In another example, a user may use tools to extend a development model, e.g., to add functionality to an existing development model and associated software application. In such cases, it may be undesirable or impossible to modify some or all of the resulting, extended development model.

It may also be desirable to utilize various performance analysis tools on services to obtain information related to performance of the services, or to obtain service improvements or suggestions for improving the performance of the services. However, different types of performance analysis tools may be supported via different performance analysis engines. For example, discrete event simulation tools may provide decision support related to throughput and utilization of resources, while layered network analysis may be provided by a different tool. This type of performance analysis may become very difficult in attempting to analyze performance of a complex service composition.

It is possible to modify development models (e.g., to modify associated development meta-models) to add annotations which may be used to better understand or implement the development models. For example, such annotations may be related to a desired performance or security level(s) of the development model, or individual elements thereof. However, in the cases such as those just mentioned where the services may be provided within several different service environments, it may be difficult or impossible to add such annotations to gain the advantages related thereto, for example, sophisticated performance related decision support which takes different service environments into account in order to provide end-to-end decision support for service compositions.

SUMMARY

According to one general aspect, a model transformation chain may include a plurality of service environment adaptor engines, each configured to obtain a respective unified development model based on transforming a service environment development model of a software application associated with a respective service environment, wherein two or more respective service environments associated with the service environment development models are different. The model transformation chain may include a first transformation engine configured to obtain a composed unified development model based on transforming the respective unified development models, the composed unified development model based on an end-to-end execution arrangement of the software applications, a second transformation engine configured to obtain a composed unified performance analysis model based on combining the composed unified development model and a plurality of performance parameters, and a plurality of performance analysis tool adaptor engines, each configured to obtain an individual performance analysis input model formatted as input for one or more of a plurality of performance analysis engines based on different performance analysis environments, based on transforming the composed unified development model using performance assessment data associated with each respective performance analysis environment. An annotation engine may be configured to associate annotations with elements of respective models processed through the model transformation chain, and configured to provide links between each annotation and its associated element to thereby output one or more composition models. A model transformation manager may be configured to coordinate transformation engines and adaptor engines within the model transformation chain to transform the plurality of development models, or subsequent transformations thereof, into one or more transformed development models and performance analysis models, and to coordinate processing within the model transformation chain to transform the one or more performance analysis models, or subsequent transformations thereof, into transformed performance analysis models, and to coordinate processing within the model transformation chain to provide a unified performance analysis assessment associated with the end-to-end execution arrangement of the software applications, based on the development models and the one or more performance analysis models.

According to another general aspect, a computer program product may be tangibly embodied on a computer-readable medium and may include executable code that, when executed, is configured to cause at least one data processing apparatus to perform the following operations. Specifically, the executable code may cause the data processing apparatus to execute a plurality of service environment adaptor engines located within a model transformation chain, each configured to obtain a respective unified development model based on transforming a service environment development model of a software application associated with a respective service environment, wherein two or more respective service environments associated with the service environment development models are different. The instructions may further cause the data processing apparatus to execute a first transformation engine located within the model transformation chain, configured to obtain a composed unified development model based on transforming the respective unified development models, the composed unified development model based on an end-to-end execution arrangement of the software applications. The instructions may cause the data processing apparatus to execute a second transformation engine located within the model transformation chain, configured to obtain a composed unified performance analysis model based on combining the composed unified development model and a plurality of performance parameters. The instructions may cause the data processing apparatus to execute a plurality of performance analysis tool adaptor engines located within the model transformation chain, each configured to obtain an individual performance analysis input model formatted as input for one or more of a plurality of performance analysis engines based on different performance analysis environments, based on transforming the composed unified development model using performance assessment data associated with each respective performance analysis environment. The instructions may cause the data processing apparatus to execute an annotation engine located within the model transformation chain, configured to associate annotations with elements of respective models processed through the model transformation chain, and configured to provide links between each annotation and its associated element to thereby output one or more composition models. The instructions may cause the data processing apparatus to coordinate the transformation engines and adaptor engines within the model transformation chain.

According to another general aspect, a method may include executing a plurality of service environment adaptor engines located within a model transformation chain, each configured to obtain a respective unified development model based on transforming a service environment development model of a software application associated with a respective service environment, wherein two or more respective service environments associated with the service environment development models are different. The method may include executing a first transformation engine located within the model transformation chain, configured to obtain a composed unified development model based on transforming the respective unified development models, the composed unified development model based on an end-to-end execution arrangement of the software applications. The method may include executing a second transformation engine located within the model transformation chain, configured to obtain a composed unified performance analysis model based on combining the composed unified development model and a plurality of performance parameters. The method may include executing a plurality of performance analysis tool adaptor engines located within the model transformation chain, each configured to obtain an individual performance analysis input model formatted as input for one or more of a plurality of performance analysis engines based on different performance analysis environments, based on transforming the composed unified development model using performance assessment data associated with each respective performance analysis environment. The method may include executing an annotation engine located within the model transformation chain, configured to associate annotations with elements of respective models processed through the model transformation chain, and configured to provide links between each annotation and its associated element to thereby output one or more composition models. The method may include coordinating the transformation engines and adaptor engines within the model transformation chain.

The details of one or more implementations are set forth in the accompanying drawings and the description below. Other features will be apparent from the description and drawings, and from the claims.

DETAILED DESCRIPTION

Figure 1:
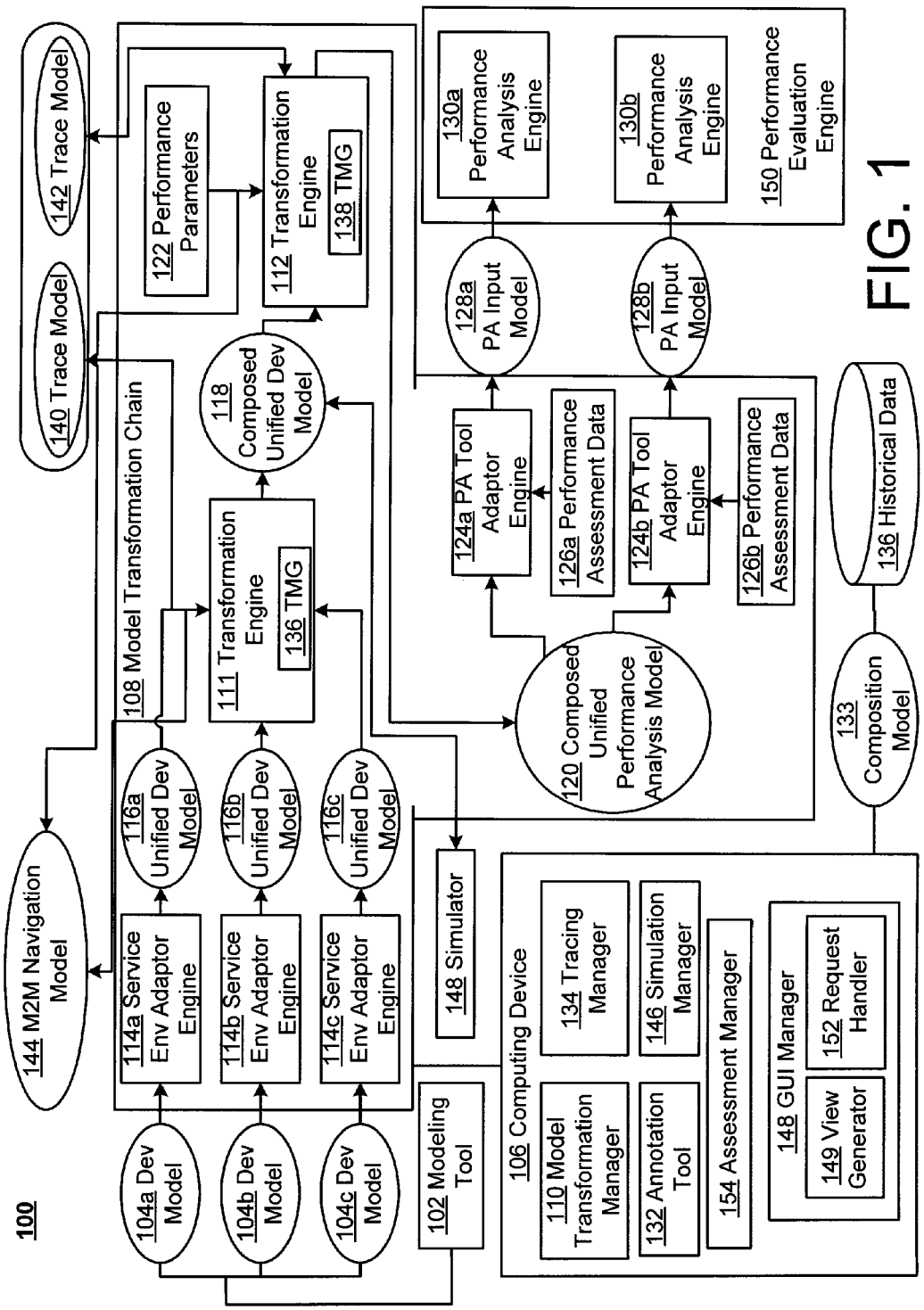
FIG. 1 is a block diagram of a system for annotation of models for performance decision support in model-driven engineering using multiple development models utilizing different service environments and multiple performance analysis engines based on multiple performance analysis contexts.

FIG. 1 is a block diagram of a system 100 for annotation of models for, among other functionalities, performance decision support in model-driven engineering using multiple development models utilizing different service environments and multiple performance analysis engines based on multiple performance analysis contexts. In the example of FIG. 1, the system 100 allows a user to annotate multiple development models (or extended development models), and to thereby better understand and/or implement the development models and associated software applications in a straightforward manner, without having to directly modify the development models to do so. For example, such annotations may be related to a desired performance, security level, or other feature or characteristic of the development models and associated software applications. In the system of FIG. 1, even though the development models are not modified directly, the annotations may nonetheless be used for their intended purpose(s), e.g., providing performance support, as if the development models had been modified directly. Thus, the user is provided with the convenience of working with familiar elements of the development models, without having to modify the development models to do so.

In FIG. 1, one or more users may use a modeling tool 102 to design development models, such as development models 104a, 104b, 104c of FIG. 1. The modeling tool 102, except as described differently herein, may contain various necessary conventional elements used to create development models, such as a graphical user interface (GUI) used to create or select (e.g., through drag-and-drop techniques) one or more shapes associated with nodes of the development models (e.g., activity nodes, execution nodes, or decision/control nodes, the latter including, for example, split/join, synchronize, fork, loop, and other known constructs for controlling a flow and execution order of the development model, along with tools to join the various nodes using branches to obtain the desired execution order). One example of a modeling tool is the Eclipse Modeling Framework (EMF), which provides the basis for many different modeling tools, along with an extension capability that allows users to add functionalities in the form of plug-ins that may be used within the framework.

In FIG. 1, the term development model may refer to virtually any model used to design and implement software-based applications or processes. Specifically, the term development model may be used to refer to the use of the system 100 in a software development (e.g., creation or design) context. Of course, it may be appreciated that the development model ultimately may be saved and deployed in association with a fully-tested and released software application that is no longer under active development, and yet the system 100 may still be used in such a context, e.g., if further performance demands warrant. In addition, the development models 104a, 104b, 104c may include underlying development models together with extensions thereof that are associated with new or additional functionality.

Each development model 104a, 104b, 104c may represent one or more technical models describing operations of software applications written in a particular language (e.g., Java), or may be models describing software processes governing business or other human-implemented activities (e.g., workflow process models that issue directions and receive responses from machine or human actors implementing steps of the process model). The development models may be described as Unified Modeling Language (UML) Activity Diagram models, or as one of many other modeling languages, where non-limiting examples of other such modeling languages may include the Business Process Modeling Notation (BPMN), Business Process Execution Language (BPEL), Web Services BPEL (WSBPEL), and Event-Driven Process Chain(s) languages. In addition, many proprietary or specialty languages may exist. Thus, the development models may represent several different service environments.

As described herein, the development models 104a, 104b, 104c may be large, detailed, and complex; moreover, the development models 104a, 104b, 104c may be proprietary or otherwise unable or undesirable to be modified (e.g., annotated). Further, there may exist a number of issues associated with one or more of the development models 104a, 104b, 104c which may result in an undesired or insufficient performance thereof. For example, a business analyst or manager may simply make a mistake, e.g., in assigning too few resources to a particular task or set of tasks, or make some other error that results in unsatisfactory performance. Given that a particular development model may be large and complex, as just referenced, it may be difficult for the user to determine the source of the unsatisfactory performance, and/or to determine a correction or improvement to obtain satisfactory performance.

In particular, it may occur that a development model is associated with a layered software application, e.g., an enterprise service architecture (ESA) or other architecture which builds more complicated, more user-friendly, and/or more detailed software layers on top of lower-level layers which provide underlying foundational elements, including the physical computing resources necessary to execute the software applications in question. In such cases, when a performance of the software application is unsatisfactory (e.g., too slow), it may occur that the source of the delay in execution is in one or more of the layers, and, moreover, it may be difficult to determine which layer is the source of the delay. For example, an apparent delay in communicating with a software service over a network actually may stem from an underlying delay in accessing a record from a database.

In another example(s), as referenced above and described below with respect to FIG. 5, one or more of the development models 104a, 104b, 104c may include a core development model and an extension thereof that is added for additional functionality. In such cases, the core development model may perform in a satisfactory manner, and yet the extension thereof may disrupt or disable the otherwise-satisfactory performance. This may particularly be the case where the core development model is provided by a large software vendor, while the extension is provided by a customer or third party as a customized, add-on feature, as described below.

Thus, in the system 100, one or more computing device(s) 106 may be used to provide non-intrusive annotations to the development models 104a, 104b, 104c. For example, such annotations may be added without requiring a change to the development models 104a, 104b, 104c or to an associated meta-model. Nonetheless, as described, the annotations may still effectively be used for their intended purpose(s) (e.g., providing performance support) with respect to the development model, as if the development model had been directly annotated.

Specifically, in FIG. 1, the computing device 106 manages a model transformation chain 108 in which the development models 104a, 104b, 104c undergo a series of transformations. Specifically, a model transformation manager 108 manages at least two transformation engines 111, 112, where each transformation engine may be said to receive an input model and output a transformed model. The model transformation manager 108 also manages at least two service environment adaptor engines 114a, 114b, 114c, where each service environment adaptor engine may be said to receive an input development model constructed in accordance with a particular service environment and output a unified development model (e.g., transforming the development model into a UML model). For example, as shown, the development models 104a, 104b, 104c may serve as input models to the service environment adaptor engines 114a, 114b, 114c, which output unified development models 116a, 116b, 116c. For example, as shown, the unified development models 116a, 116b, 116c may serve as input models to the transformation engine 111, which outputs a composed unified development model 118 (i.e., a transformed model), which itself serves as an input model to the transformation engine 112, which, in turn, outputs a composed unified performance analysis model 120 (i.e., a transformed model). As shown in FIG. 1, the transformation engine 112 outputs the composed unified performance analysis model 120 based in input performance parameters 122, as discussed further herein.

The model transformation manager also manages at least two performance analysis tool adaptor engines 124a, 124b, where each performance analysis tool adaptor engine may be said to receive as input the composed unified performance analysis model 120, along with performance assessment data 126a, 126b, respectively, to output respective performance analysis input models 128a, 128b. The performance analysis models 128a, 128b may then be input to respective performance analysis engines 130a, 130b, which may perform different analyses related to performance of the development models, and may be constructed utilizing different performance analysis contexts.

Discussion of various types and characteristics of the various transformations are provided below, and of course it may be appreciated that many more transformation engines may be involved in the model transformation chain 108. But in general, the transformation chain serves to transform the development models, in a series of steps, into desired forms for various performance analysis tools. In so doing, the transformation chain 110 also incorporates desired annotations of the development models, and makes feasible the relating of these annotations, at least within an annotated, composed unified performance analysis model 120 back to the original development models 104a, 104b, 104c. Consequently, as described, the annotations may be used for their intended purpose, without requiring modification of the development models.

For example, an annotation tool 132 may be used to annotate the development models 104, 116 to obtain a composition model 133 that contains the annotations as well as links of the annotations to their respective elements within the development models 104, 116. In an example where the annotations are performance-related, such as when the user wishes to know whether tasks of the development model may be processed within a certain timeframe or using a certain minimum/maximum number of resources, then historical data 136 related to these constraints/parameters/requirements in past implementations of the development models 104, 116 may be used as part of the annotation process to obtain the composed unified performance analysis model 120.

Thus, the composition model 133 may be used to represent annotations including the linkage information about which annotation is associated with which model element in the original source model. Hence, the composition model 133 may include two parts: One for the annotation itself and one for the linkage information. Due to the fact that the linkage information is included in the composition model 133, it is not required to modify the original source models with this data General examples of operation of the annotation tool 132 are provided in detail with respect to FIG. 2. More specific examples of the operation of the annotation tool 132 in the performance realm, including example uses of the historical data 136, are provided in detail further herein.

In FIG. 1, transformation engines 111, 112 may also serve to annotate their respective input models, in addition to (or as part of) transforming the input model(s) into the transformed model(s). For example, the transformation engine 112 may provide an annotation functionality in association with transforming the model 118 to obtain the annotated, composed unified performance analysis model 120. That is, the annotated, composed unified performance analysis model 120 represents a model that is transformed from the development models 104, 116 into another desired form (such as one suitable for simulation thereof, as described herein), and yet contains annotations (e.g., about performance information) that are relevant to the development model.

As may be appreciated, however, there may not be a one-to-one correspondence between elements of the annotated, composed unified performance analysis model 120 and the original development models 104a, 104b, 104c. For example, as part of the transformation processes, some elements (e.g., nodes) of the development models 104a, 104b, 104c may be consolidated, non included, split into two or more nodes, or otherwise altered from their original form/structure. Therefore, even if the user is provided with a functional simulation or other use of the annotated, composed unified performance analysis model 120, such information may not be usable to the user with respect to the original development models 104a, 104b, 104c.

Therefore, a tracing manager 134 may be used in association with trace model generators 136, 138 to generate trace models 140, 142. As shown in FIG. 1 and discussed in more detail below, the trace model generators 136, 138 may be incorporated into the transformation engines 111, 112, respectively, e.g., may generate the trace models 140, 142 in conjunction with the generation of the transformed models 118, 120.

In use, the trace models 140, 142 serve to relate source elements of an input model of a transformation engine to target elements of a transformed model of the transformation engine. That is, generally speaking, trace or tracing models 140, 142 may contain associations between models conforming to two different models or meta-models.

In this way, as described herein, the tracing manager 134 may permit recursive tracking of information (e.g., simulation results) related to the annotated, composed unified performance analysis model 120 back to the original development models 104, 116, for convenient use thereof by the user. In particular, as described in more detail herein, the tracing manager 134 may employ a model-to-model (M2M) navigation model 144 to track the trace models 140, 142 and maintain navigation information related to which models of the model transformation chain are related to each of the trace models 140, 142. The M2M navigation model 144 may thus be used to associate models in the model transformation chain 108 with the related trace models 140, 142. This is advantageous in the case where the various models of the transformation chain 108 are effectively non-changeable and therefore should or must not be polluted with the tracing model linkage information.

For instance, a simulation manager 146 may thus cause a simulator 148 to execute a simulation of the annotated, composed unified performance analysis model 120 and thereby obtain simulation results, based on the performance analysis engines 130, 130b. In some implementations, the simulation results may be provided directly back to the user using a graphical user interface (not shown in FIG. 1).

For example, a development model, as discussed below, may relate to a workflow for producing wine. The simulator 148 may provide a simulation of the annotated, unified development models 116a, 116b, 116c that illustrates a performance of this workflow, such as a time to completion. The tracing manager 134 may relate these simulation results back to the development models 104, 116, and the GUI may illustrate one or more of the development models 104, 116 including an annotation for certain elements of the development models 104, 116 associated with a time to completion (e.g., a half-day for each element). Then, the user may be made aware of whether the overall process will complete in time, and/or which element of the development model may be problematic in achieving this objective.

A GUI manager 148 may be responsible for facilitating operation of the GUI. For example, the GUI manager 148 may include a view generator 149 that provides the user with options for running certain types of simulations, such as a simulation of one of the development models 104, 116. Upon instruction from the user by way of a request handler 152, the GUI manager 148 may notify the model transformation manager 110, the annotation tool 132, and the tracing manager 134 (and an assessment manager as described below) to perform their respective functions, execute the transformation chain model 108 and related processes, and generate simulation results which are related back to the development models 104, 116. Then, the view generator 149 may provide these simulation results, e.g., by providing each relevant element of the development model in association with its relevant annotation(s) (e.g., time to completion of the element).

In many cases, however, simply obtaining a simulation result in this manner may not be sufficient or preferable. For example, a user may wish to know more than a yes/no answer as to whether the development model 104, 116 will achieve a desired performance result. For example, when the simulation result yields the information that a desired performance will not be achieved, then the user may benefit from decision support that provides the user with information about which element of the development model should be changed to obtain the desired result.

Such information may be provided by an assessment manager 154, which manages a performance evaluation engine 150 in utilizing decision support model(s) to provide such information to the user. For example, the performance evaluation engine 150 may include the performance analysis engines 130a, 130b, as shown in FIG. 1. The performance evaluation engine 150 may use tracing information, e.g., from the tracing manager 134 as determined from the trace models 140, 142 and the M2M navigation model 144, to relate relevant decision support back to the development models 104, 116.

More particularly, the GUI manager 148 may provide the user with a GUI in which elements of the development models 104, 116 are illustrated together with relevant annotations and/or decision support information.

Thus, the system 100 of FIG. 1 may assist a user in determining whether and how to improve a performance of a software process described by the development models 104, 116. The system 100 of FIG. 1 may also assist the user with means for requesting several different types of performance analysis for evaluation of the development models 104, 116, without the user needing significant performance analysis expertise. For example, the system 100 may assist the user in determining which node of the development model 104 or 106 is most likely to be associated with a performance delay, and what the source of the delay is, as well as what corrective action may be taken to correct the delay. The system 100 may also assist the user in determining optimizations, such as optimizations in staffing various departments within a company. In so doing, the system 100 may provide a reduced amount of information to the user; e.g., instead of providing performance information for all possible nodes of the development model 104 or 106, the system 100 may limit the information only to those nodes which are associated with modifiable attributes, and/or may provide an optimized combination of nodes to be modified to obtain a desired result/improvement. In this way, the user is provided with multiple different types of performance decision support for model-driven engineering based on development models utilizing multiple different service environments, and may independently improve a performance of a development model, with a minimum of time, effort, and cost, and without assistance (or minimal assistance) from a performance expert.

For example, the development model 118 may be evaluated as a whole, without altering the development model 118, to determine whether the extended model/functionality disrupts the overall operation. Then, it may be possible for the user to modify only the extended portion of the development model to obtain the desired result.

Some of the elements of the system 100 may be implemented, in whole or in part, using known and/or conventional elements, some examples of which are provided below. Generally, though, the transformation engine 111 may be implemented, for example, using the ATLAS (ATL) transformation tool, and the simulator 148 may be implemented using the AnyLogic simulation tool.

Although the above examples have been given primarily in terms of performance analysis and support, it will be appreciated that the system of FIG. 1 may be used for other purposes, as well, with similar advantages in terms of annotating the development models 104, 116 for other purposes, without requiring modifications to the development model or metamodel to do so, as described herein. For example, examples of such contexts and purposes may include scenarios in the security realm, such as where additional security processes are to be tested for strength, compatibility, or other purposes. In other examples, annotations may be used to visualize layout information for the development model. It should be appreciated, then, that the term simulation should not be limited to performance simulations, and may refer to the above or other example simulations or representations of a result of an operation of the development model 106.

In this regard, it will be appreciated that there may be multiple elements of FIG. 1 that may perform such evaluations. That is, it may be appreciated that any type of computation(s) or evaluation(s) such as those just referenced may be performed based on the development models 104, 116, the composed unified development model 118 (with the appropriate annotations), the composed unified performance analysis model 120, and with the model transformation chain 108 itself, which incorporates the models 116, 118, 120 as part of a potentially long transformation chain in which trace models 140, 142 are used to relate the results back to the original development models 104, 116. The use of such a generic evaluation engine is represented in FIG. 1, where the evaluation engine 150 is illustrated as an example evaluation engine. However, the transformation engine 112 which may receive the models 118, 133 also may serve as an example of such an evaluation engine, as may other types of elements such as in the security or layout examples above.

Thus, generally speaking, a model transformation chain 108 may include a plurality of service environment adaptor engines 114a, 114b, 114c, each configured to obtain a respective unified development model 116a, 116b, 116c based on transforming a service environment development model 104a, 104b, 104c of a software application associated with a respective service environment, wherein two or more respective service environments associated with the service environment development models are different.

The model transformation chain 108 may include a first transformation engine 111 configured to obtain a composed unified development model 118 based on transforming the respective unified development models 116a, 116b, 116c, the composed unified development model 118 based on an end-to-end execution arrangement of the software applications. A second transformation engine 112 may be configured to obtain a composed unified performance analysis model 120 based on combining the composed unified development model 118 and a plurality of performance parameters 122.

The model transformation chain 108 may include a plurality of performance analysis tool adaptor engines 124a, 124b, each configured to obtain an individual performance analysis input model 128a, 128b formatted as input for one or more of a plurality of performance analysis engines 130a, 130b based on different performance analysis environments, based on transforming the composed unified performance analysis model 120 using performance assessment data 126a, 126b associated with each respective performance analysis environment.

The system of FIG. 1 may include an annotation engine 132 configured to associate annotations with elements of respective models processed through the model transformation chain 108, and configured to provide links between each annotation and its associated element to thereby output one or more composition models 133. A model transformation manager 110 may be configured to coordinate transformation engines 111, 112 and adaptor engines 114a, 114b, 114c, 124a, 124b within the model transformation chain 108.

Although FIG. 1 is illustrated in an abstract and simplified form, it will be appreciated that the system 100 supports a high quantity of large, varied, and complex development models. For example, the transformation chain 108 may be composed of a large number of transformations that may be needed or desired to obtain a desired result for simulation. Nonetheless, because of the discrete nature of the transformation engines 111, 112, the user may select and configure only those transformation engines that are needed for a particular transformation chain. Thus, the system 100 presents a modular approach that may be adapted to a specific situation.

Further, in the example of FIG. 1, several examples are given in which models are annotated with performance or other types of annotations, as described. In more detail, in this context, the term annotation (also possibly referred to as a profile, profile model, profile meta-model or using other known nomenclature in the art) refers generally to a technique for extending a functionality or use of an underlying model, as described in more detail below, e.g., with respect to FIG. 2. For example, as already described, it is generally known that models at a given layer of abstraction may be annotated in order to provide a desired use, feature, or functionality for an associated software application, such as when an otherwise generic model/application is to be implemented in a more specific context or domain. Such annotations may themselves be formalized, so that designers or other users may add desired features or functionalities to models in a straightforward, consistent manner.

For example, models expressed in the Unified Modeling Language (UML) may be associated with a number of such profiles, e.g., meta-models providing extensions to the language they effectively extend (e.g., UML). The extensions can provide domain specific information, such as, for example, when a UML model may include an element (node) that is associated with a particular software component (e.g., a software component associated with processing a credit card transaction). Then, for example, a designer may wish to associate a security profile to the element, in order to provide a desired level of security for the credit card transaction. Since the security profile itself may be pre-defined and substantially uniform, the designer or other user may also apply the same security profile to other elements of the example UML model, or to (elements of) other UML models entirely.

Analogously, as already referenced in the performance realm, performance annotations may exist which characterize a performance or execution of the software process characterized by a development model. For example, such performance annotations may characterize a probability of execution of a branch of a development model, or a resource usage of a node of the development model, or an average time of execution of a node of the development model, or other performance-related information. Examples of such performance profiles include the Scheduling, Performance, and Timing (SPT) profile, the Modeling and Analysis of Real-Time and Embedded Systems (MARTE) profile and its Performance Analysis Model, among others. Specialized performance annotations also may be constructed by the developer or others for use in the system 100.

For example, a user may wish to apply a modification constraint such as a min/max number of employees that may be assigned to a department associated with a node or type of node, as described above. However, the department and node (type) may occur multiple times within a single development model and/or profile meta-model, and also may occur one or more times within a group or collection of such models/profiles. Moreover, although the user may wish to specify a particular employee range at a point in time, it may later occur that a different range may be desired (e.g., if a new employee is hired, or a current employee leaves or is reassigned). Therefore, it may be problematic to specify and thereafter update the accurate/desired range everywhere that the associated node/department appears within the model(s) in question.

Due to the factors just referenced (e.g., large number of model nodes/elements, large number of profile elements/annotations, and/or potentially frequent changes/updates of the models or profiles), it may be advantageous to be able to use flexible, automated annotation engine(s) referenced herein to implement the system 100. For example, FIG. 2 is a block diagram of a system 200 for providing non-intrusive model annotation for model-driven engineering.

Figure 2:
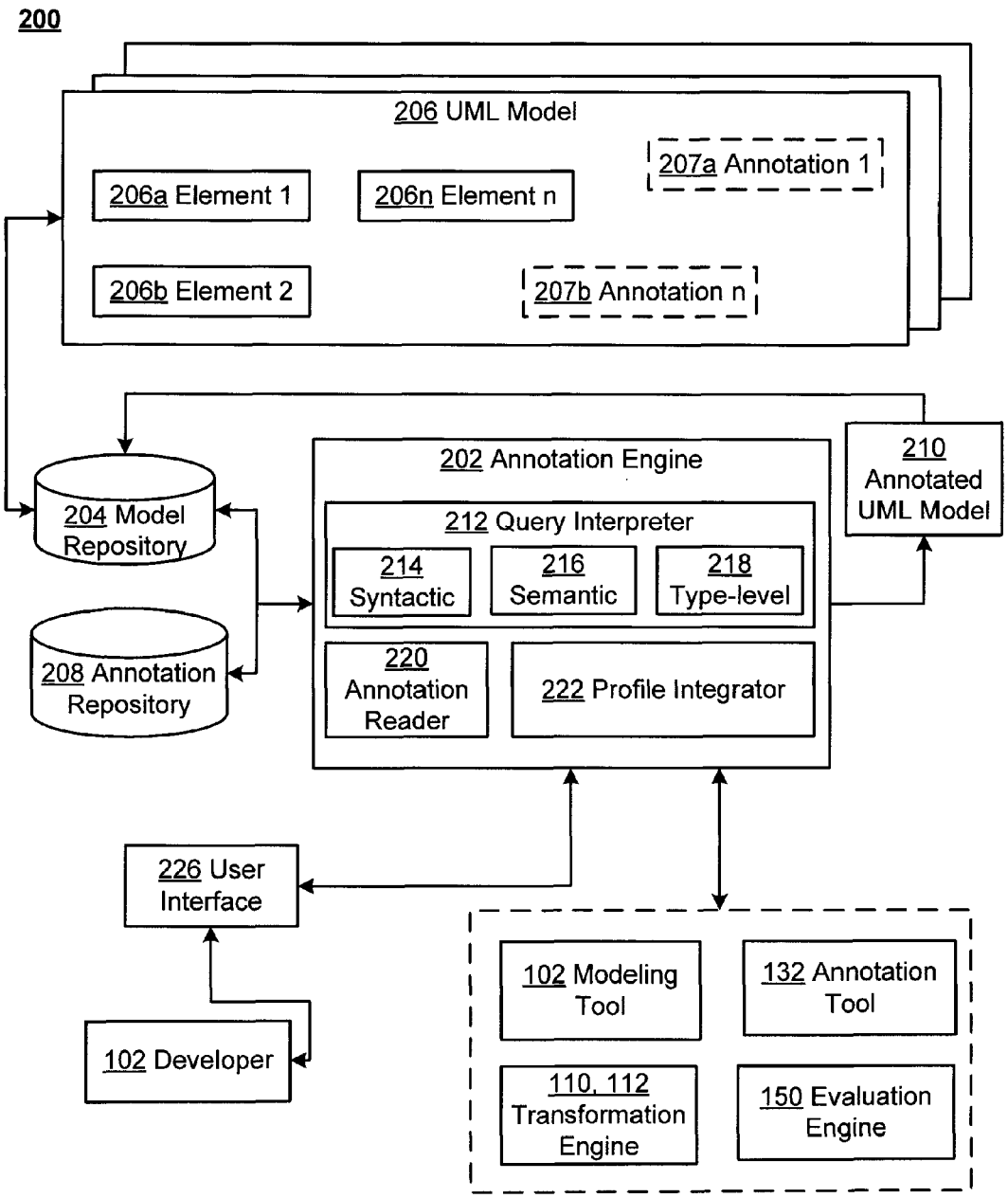
FIG. 2 is a block diagram of a system for providing non-intrusive model annotation for model-driven engineering.

Thus, FIG. 2 illustrates an annotation engine 202 that may be used to perform various aspects of the system 100 of FIG. 1. More specifically, the annotation engine 202, as shown, may be used in conjunction with, or as part of, one or more of the modeling tool 102, the transformation engines 111, 112, the annotation tool 132, and the evaluation engine 150. That is, the discussion of FIG. 2 is primarily provided in the context of a generic version of the annotation engine 202, which may be used in whole or in part by any of the elements 102, 111, 112, 132, and 150 to execute the functionality described above, and which is therefore described essentially independent of any one of these tools for the purposes of FIG. 2.

Thus, in the example of FIG. 2, the annotation engine 202 may be configured to query a model repository 204 to obtain desired elements and/or desired models (e.g., a model 206, shown in FIG. 2 as a UML model). The annotation engine 202 may also access an annotation repository 208 containing a number of possible annotations (e.g., as profiles) to be provided to the UML model 206 (e.g., to elements thereof). Then, the annotation engine 202 may extend or modify the obtained models/elements using the accessed profiles, to thereby obtain an annotated model 210. The annotated model 210 may then be used to implement an associated software application (not illustrated in FIG. 2, but considered to be, for example, any of the various software applications, workflow processes, or other software processes described herein), and/or may be returned to the model repository 204 for further annotation thereof, as desired. It will be appreciated that the annotation repository 208 may thus represent, for example, a repository storing the composition model 133 and/or decision support models, as well as annotation models.

Thus, the annotation engine 202 allows for convenient and flexible access to the model repository 204 and to the annotation repository 208, even when the repositories 204, 208 contain large numbers of models and annotations (e.g., profiles), respectively. Consequently, for example, designers or other users may easily obtain only those models/elements that are desired for annotation thereof. Further, the resulting annotation(s) may proceed in an automatic, intuitive fashion. As a result, designers or other users may provide the annotated model 210 as a more domain-specific version of the original, more abstracted model 206, and, if necessary, may also later modify the annotated model 210 (e.g., change the annotation or add a new annotation/profile) in a straightforward fashion.

As may be appreciated from the above description, then, the model repository 204 may contain hundreds or thousands of models, where each model may contain tens, hundreds, or thousands of elements or other nodes. In the simplified example of FIG. 2, the single UML model 206 is illustrated as including element 1 206a, element 2 206b, and element n 206n. That is, as may be understood from basic principles of UML, the UML model 206 may include these elements 206a, 206b, 206n as being graphically represented and arranged to illustrate a functionality, operation, or other characteristic of an associated software application or other process.

Meanwhile, as described, one or more annotation meta-models or annotations provided for UML may exist in the annotation repository 208. As a result of the operations of the annotation engine 202, as described herein, an annotation 207a and 207b may be applied to the UML model 206 as being annotated to the element 206n. Although the UML model 206 illustrates the annotations 207a, 207b with dashed lines to illustrate their optional addition to the UML model 206 based on actions of the annotation engine 202, it may be appreciated that the inclusion of the annotations 207a, 207b allow the UML model 206 to serve as an example of the annotated UML model 210, as well (which, as described, may be returned to the model repository 204 for use and/or for further annotation thereof).

Many other examples of models, elements, and associated annotation or profiling thereof are described herein. In general, the concepts related to the extension of models/elements through the use of an associated extension or profile meta-model may be known or characterized by a plurality of terms and terminologies. For example, although the annotation of the UML model 206 is described herein as such, it may be appreciated that such model annotations also may be referred to as refining, branding, stereotyping, integrating, composing, or specifying the models/elements, or may be referred to as adding metadata to the models/elements. Such terminology may be overlapping or interchangeable, or may be dependent on the type of modeling language, model, or element being profiled/extended/annotated. Further, although the elements 206a, 206b, 206n are referred to as being associated with a software component, it may be appreciated that UML includes other (or more specific) types of elements, e.g., interface elements, activity elements, class elements, operation elements, or state machine elements.

Thus, in general, in the context of UML models used in the present examples, the concept of profiling the models/elements is known, and is not described further herein, except to provide illustrations and examples of operations of the annotation engine 202 in various contexts of the system 100 of FIG. 1. However, although concepts of profiling/annotation are known to some extent in UML, Java, or other contexts, these known concepts, by themselves, may suffer reduced or eliminated utility relative to the example system 200 of FIG. 2. For example, as already referenced, the model repository 204 may contain hundreds or thousands of models, so that, without the annotation engine 202, a designer or other user may need to sort through the many models in order just to find the desired models/elements, and then proceed to add a desired annotation(s) to each element. If a designer fails to determine all desired models/nodes, or determines incorrect ones of the desired models/nodes, then the resulting annotation will be incorrect and/or incomplete. Moreover, even if the desired annotation is completed accurately, the time required to do so may be impractical. Still further, even if the desired annotations are completely and correctly added, it may later occur that the annotation(s) themselves must be amended or corrected, whereupon the designer may have to re-implement the process of locating desired models/elements for (re) annotation thereof. In contrast, the annotation engine 202 allows for flexible, automated profiling that may be completed quickly and accurately by non-profiling experts, and may be repeated as circumstances warrant.

In particular, the annotation engine 202 allows querying of the model repository 204 in a manner that returns, as a result set, desired models/elements that the designer or other user wishes to annotate. For example, the annotation engine 202 may include a query interpreter 212 that executes queries against the (e.g., performance-related, development model or performance analysis model) model repository 204. These queries may include, for example, syntactic queries 214, semantic queries 216, or type-level queries 218.

The annotation engine 202 further includes an annotation reader 220 that may be configured to obtain a desired annotation meta-model from the annotation repository 208, and a profile integrator 222 that may be configured to receive the annotation meta-model from the annotation repository 208 for the creation and integration of instances thereof with the result set of models/elements provided by the query interpreter 212. Then, as described herein, the profile integrator 222 may be configured to output the annotated UML model 210 (e.g., back to the model repository stations and/or for use in an associated software application or other process).

In some implementations, the annotation engine 202 may be configured to compile, interpret, or otherwise process a domain-specific language (DSL) to obtain the properties and functionalities described herein, such as the Query and Annotation Language (QUAL). For example, one or more such DSL(s) may provide for the querying of the model repository 204 by the query interpreter 212, the reading of the annotation repository 208 by the annotation reader 220, and/or the annotation of the retrieved model/elements with instances of the retrieved profile(s) by the profile integrator 222.

A user interface 226 may represent a graphical user interface (GUI) used by a designer or other user to utilize the annotation engine 202, and/or may include a browser, a text editor, or any known technique to, for example, enter query parameters or otherwise specify models or profiles. The user interface 226 may be provided to or accessed by a developer or other users.

Although FIG. 2 illustrates a number of example implementations of the annotation engine 202, it will may appreciated that these examples are illustrative, and non-limiting. Additional or alternative examples are provided herein, and still further implementations, not explicitly discussed, also would be apparent to those of skill in the art.

Figure 3:
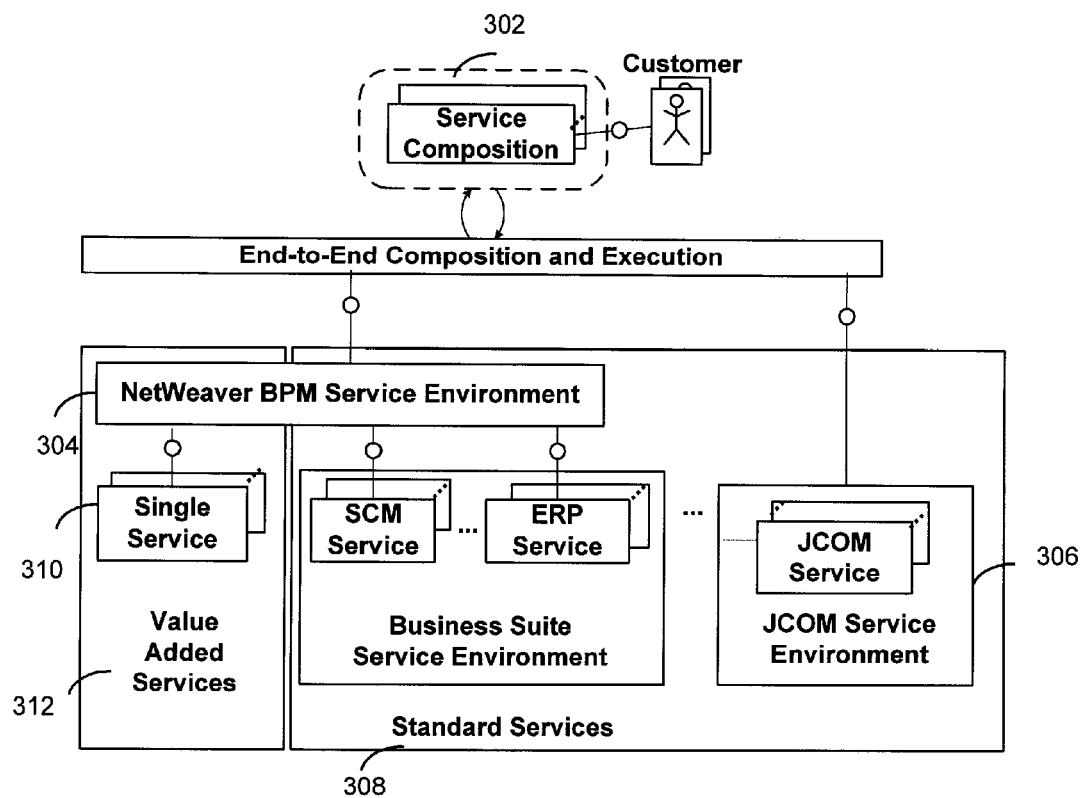
FIG. 3 is a block diagram of an example service composition.

FIG. 3 is a block diagram of an example service composition 302. As discussed with regard to the system of FIG. 1, a service composition may include software applications employing multiple, diverse service environments, and may employ end-to-end composition and execution. For example, the example service composition 302 illustrated in FIG. 3 may be provided by one or more enterprise software vendors, for example, SAP and JCOM. As shown in FIG. 3, the example service composition 302 includes services associated with a NetWeaver BPM Service Environment 304 and a JCOM Service Environment 306. Standard services 308 are included within each service environment, but the NetWeaver BPM Service Environment 304, as shown, is extended with single services 310, which are maintained as value added services 312. In such cases, different parts of the service composition may be specified and modeled with different tools such that each modeling tool/specification language has its own underlying meta-models for their service definitions. Thus, performance related decision support associated with this type of service composition may benefit from performance analysis systems that abstract these different meta-models. Further, such service compositions may benefit greatly from performance analysis systems (e.g., as shown in FIG. 1) that employ integration of multiple performance analysis engines such as the engines 130a, 130b of FIG. 1.

For example, decision support related to throughput and utilization of resources may be provided by discrete event simulation tools such as AnyLogic. Such tools may also provide predictions related to the gross execution time of service composition instances, for example, in order to answer questions such as "How will the execution time of a Sales Ordering Process be affected by a certain planned increase of the number of Sales Orders?". Additionally, optimization tools may need to be integrated for performance related decision support, for example, in order to decide at which point of time a certain business resource is needed to meet processing targets and to optimize revenue. For optimization, existing libraries and tools may be used, such as OptQuest, which is also employed by the AnyLogic tool. Moreover, it may be desirable to integrate analytical performance analysis tooling. For example, an analytic Layered Queuing Network (LQN) analysis with an example LQNS tool may be beneficial in service compositions wherein resources are used in a layered manner, as in cases of a Sales Order Processing wherein certain process steps may only be finalized if support from an invoicing department is provided. Such support may itself be further dependent on an IT-department. If the Sales Order Processing is not processed within predetermined targets, a user may need support to identify which of the sub-services composing the Sales Order Processing (e.g., sales-department, Invoicing-department, or IT-department) is the bottleneck of the service composition.

Sensitivity Analysis may also be performed by analytical performance analysis tools. Such analysis may require numerous performance analysis runs (e.g., 1000 runs) which may be executed analytically within milliseconds to seconds. However, a sensitivity analysis may require on the order of minutes to years in the context of a simulation based performance analysis engine. Analytical tools disadvantageously normally only offer approximated results (e.g., adapting the process into specific mathematical systems) whereas simulations may permit very customized and therefore fine tuned and accurate results, as they offer a more generic concept.

Figure 4:
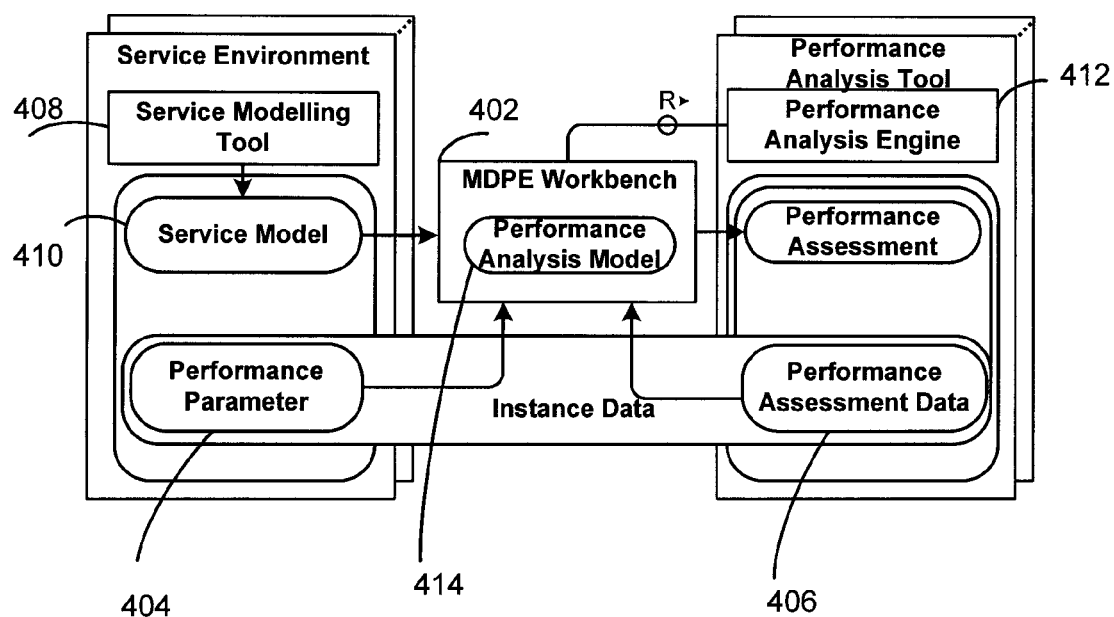
FIG. 4 is a block diagram of an example Model-Driven Performance Engineering (MDPE) Workbench.

FIG. 4 is a block diagram of an example Model-Driven Performance Engineering (MDPE) Workbench 402 that integrates a number of performance analysis tools and abstracts the service specification/modeling languages used by different Service Environments, similar to the system 100 discussed above with regard to FIG. 1. The MDPE Workbench 402 utilizes service composition monitoring data (e.g., Instance Data), in particular, performance parameters 404 (e.g., the performance parameters 122 of FIG. 1) and user provided performance assessment data 406 (e.g., the performance assessment data 126a, 126b of FIG. 1). Performance parameters 404 may include values specifying the resource related behavior of the service composition over a period of time. Performance assessment data 406 may be used to guide the performance analysis, for example, according to business requirements or optimization objectives.

As shown in FIG. 4, a service modeling tool 408 may be similar in functionality to the modeling tool 102 as discussed with regard to FIG. 1. A service model 410 may be viewed as an example of the service development models 104a, 104b, 104c of FIG. 1. A performance analysis engine 412 of the MDPE Workbench 402 may be viewed as an example of the performance analysis engines 130a, 130b of FIG. 1, and a performance analysis model 414 may be viewed as an example of the composed unified performance analysis model 120 as discussed previously with regard to FIG. 1.

Figure 5:
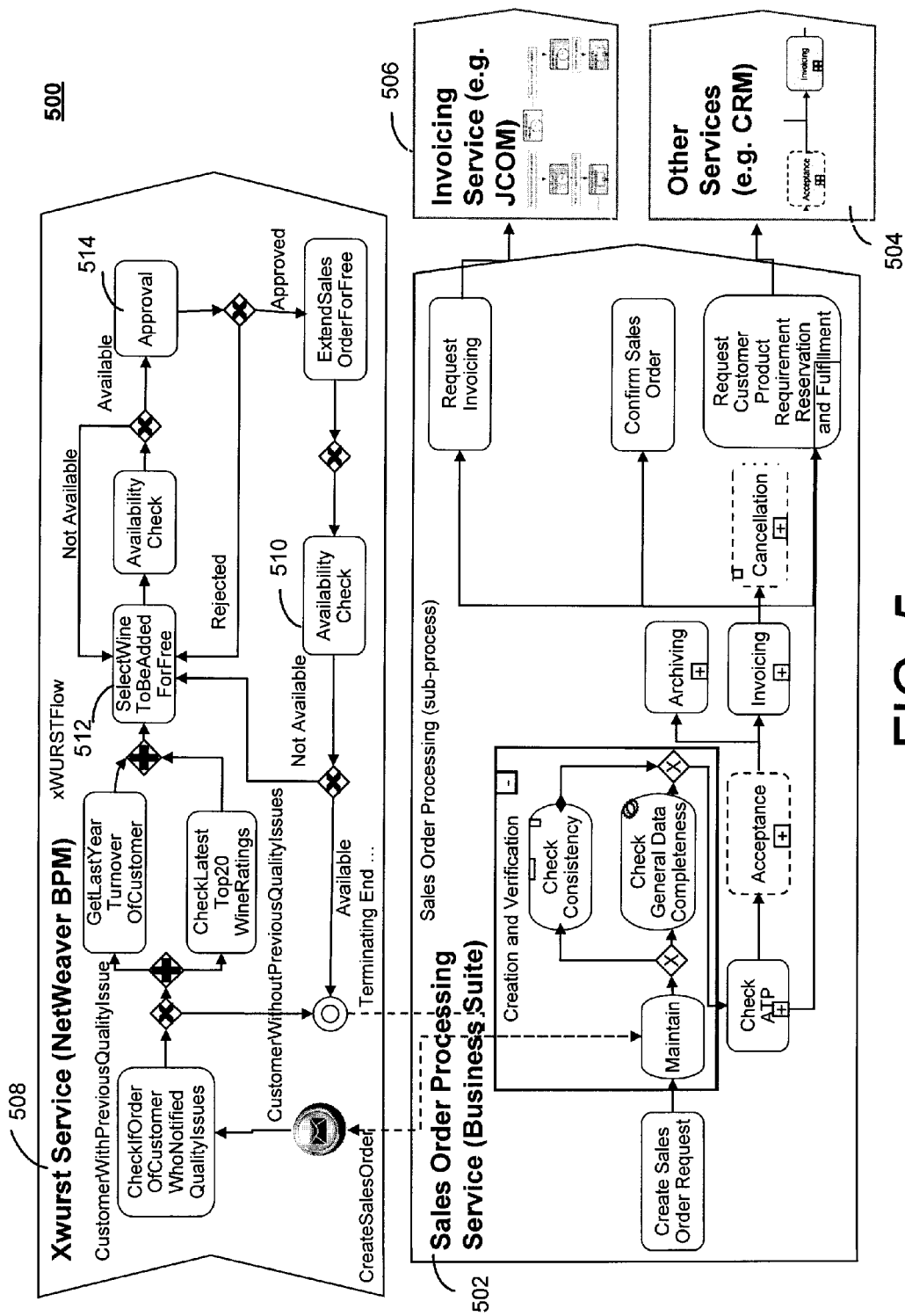
FIG. 5 is a diagram of an industrial example of a Service Composition spanning across multiple different service composition and execution environments.

FIG. 5 is a diagram 500 of an industrial example of a Service Composition spanning across three different service composition and execution environments. In the example of FIG. 5 a wine seller obtains his wine supply from several suppliers, and thereafter sells the wine to different customers. The sales and distribution organization of the wine seller maybe supported by a conventional software product implementing conventional services. As shown in FIG. 5, a Sales Order Processing service 502 may be organized in functional units (e.g., sub-services) providing their own business behavior. Thus, a concrete business service may be composed of multiple sub-services.

The bottom layer of FIG. 5 depicts the "Sales Order Processing" service 502, which triggers other services 504 in a Business Suite, which may be considered as one service environment. These additional services are, for simplicity, ignored in this discussion. However, the "Sales Order Processing" service is specified as a "Process Flow Model" with the aid of a SAP proprietary modeling language called Process Flows Models.

As can be seen in FIG. 5, the "Sales Order Processing" service 502 triggers another external service 506 for invoicing, which is outsourced by the wine seller to a third party vendor. The invoicing service 506 is specified in a different modeling language, e.g., JPASS, and is also executed in a different service execution environment, called the JCOM environment. The JPASS tool enables top-down modeling of service compositions with the help of the JPASS modeling language. Thus, JCOM is employed as an additional service environment for this example.

For the example of FIG. 5, the sales and distribution organization of the wine seller additionally requested an extension of the standard business service so that an extra free bottle of wine could be added to orders of customers who reported a quality issue in their previous order. The decision regarding which wine will be added for free needs to be taken manually by a wine specialist based on a wine rating and the customer's purchase history over the last 12 months. Additionally, the selection needs to be approved by a manager of the sales and distribution organization.

Thus, an extended version of the "Sales Order Processing" service 502 may be utilized for this case. However, it may not be desirable to change the service 502 directly because the service composition should be independent of the software vendors' life cycle, (e.g., SAP and JCOM in this case). To meet this independence requirement, a service 508 called "XWurst—Wine Under Special Treatment" may be implemented, as shown in FIG. 5. In order to add the extended behavior, the XWurst service 508 may be composed from a Value Added Service, such as a Select Wine ToBeAddedFor-Free sub-service, together with the sub-services of the Sales Order Processing service 502 (reconfiguration of Sales Order Processing service), such as an AvailabilityCheck sub-service 510.

For an example implementation of this extended behavior, a different BPMN based tool called "Process Composer", which is a part of the NetWeaver BPM tooling, may be employed as a third service environment for the XWurst service 508.

A (business) domain expert, with no performance expertise, generally cannot predict the performance related consequences if such an extension is deployed. In this particular service composition scenario, there exist different chunks of services constituting the composition modeled and executed in different environments, (e.g., the Business Suite, JCOM, and NetWeaver BPM composition in the context of the wine seller example). A performance issue that may need to be analyzed in this case is to determine whether the two additional manual approval steps, introduced via the XWurst service 508 as steps 512 and 514 in the service composition will now need more time than defined as an objective.

Furthermore, the complete end-to-end service composition may need to be considered for performance related decision support since the whole service composition will be influenced by the newly added service via the XWurst Service 508. This type of performance analysis will thus need to consider a composite of three different service composition and execution environments (i.e., three different process modeling tools established in different execution environments).

Figure 6:
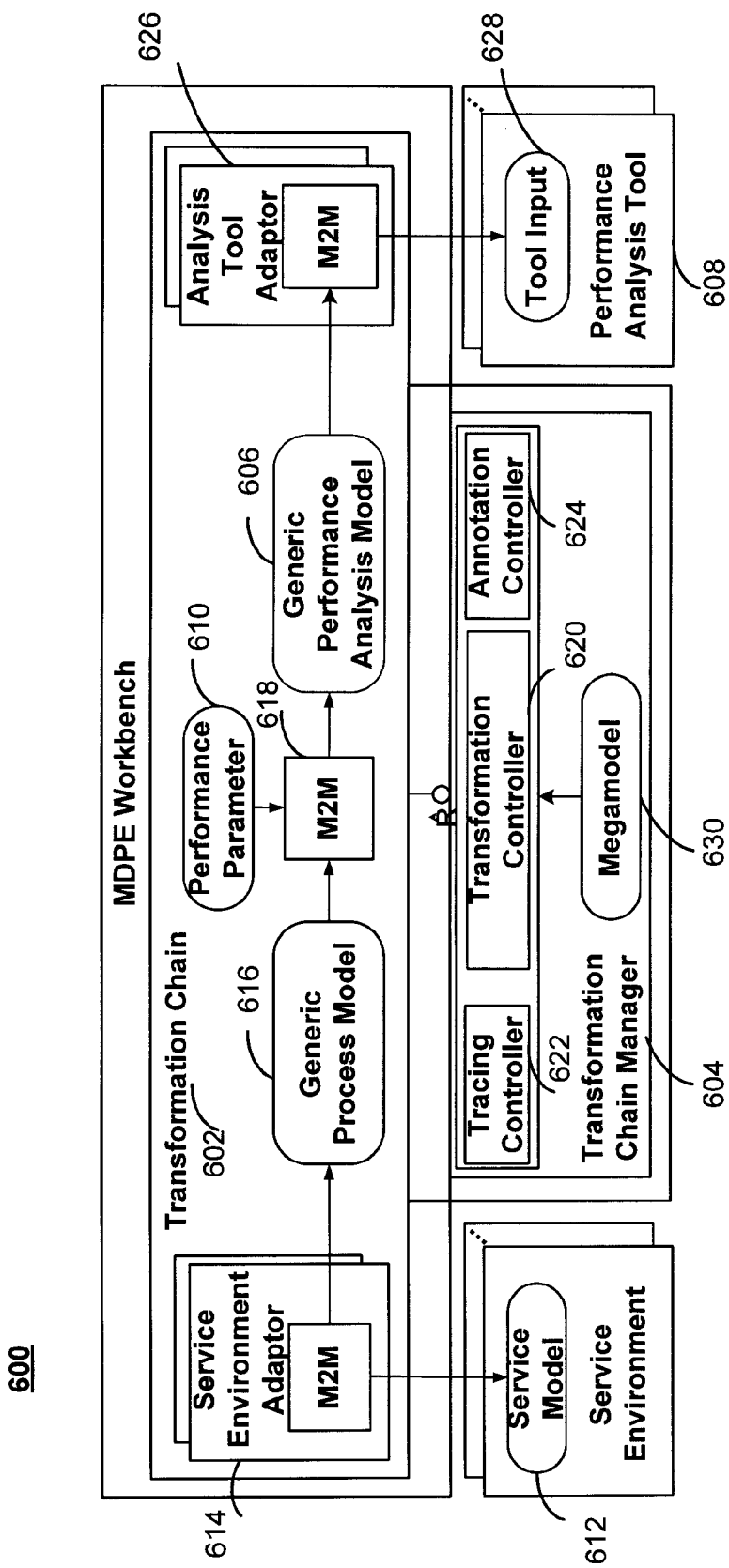
FIG. 6 is a block diagram of an example system for annotation of models for performance related decision support in service compositions spanning multiple BPM Tools.

FIG. 6 is a block diagram of an example system 600 for annotation of models for performance related decision support in service compositions spanning multiple BPM Tools. As shown in FIG. 6, a combination of a transformation chain 602 and a transformation chain manager 604 is proposed as a solution for the previously mentioned issues, similar to the model transformation chain 108 and the model transformation manager 110 and other elements of the computing device 106 of FIG. 1.

An example solution to abstract a number of service specification/modeling languages is to introduce a generic performance analysis model 606 as shown in FIG. 4, similarly to the composed unified performance analysis model 120 of FIG. 1. This model 606 is used to abstract the different performance analysis tools 608 (similar to abstracting the performance analysis engines 130a, 130b of FIG. 1). In the MDPE architecture 600, the model 606 is a performance analysis specific pivot model which combines performance parameters 606 and service models 612 (e.g., the performance parameters 122 and the service environment development models 104a, 104b, 104c of FIG. 1). This pivot model 606 may integrate the user provided performance assessment data 126a, 126b of FIG. 1, such as performance optimization constraints.

Example service environment adaptors 614 correspond to the service environment adaptor engines 114a, 114b, 114c of FIG. 1, and a generic process model 616 corresponds to the composed unified development model 118 of FIG. 1. A M2M transformation engine 618 corresponds to the transformation engine 112 of FIG. 1, and a transformation controller 620, tracing controller 622, and annotation controller 624 correspond to the model transformation manager 110, tracing manager 134, and annotation tool 132, respectively, of FIG. 1. An analysis tool adaptor 626 and tool input 628 correspond to the performance analysis tool adaptor engines 124a, 124b and the performance analysis input models 128a, 128b, respectively, of FIG. 1.

Figure 7:
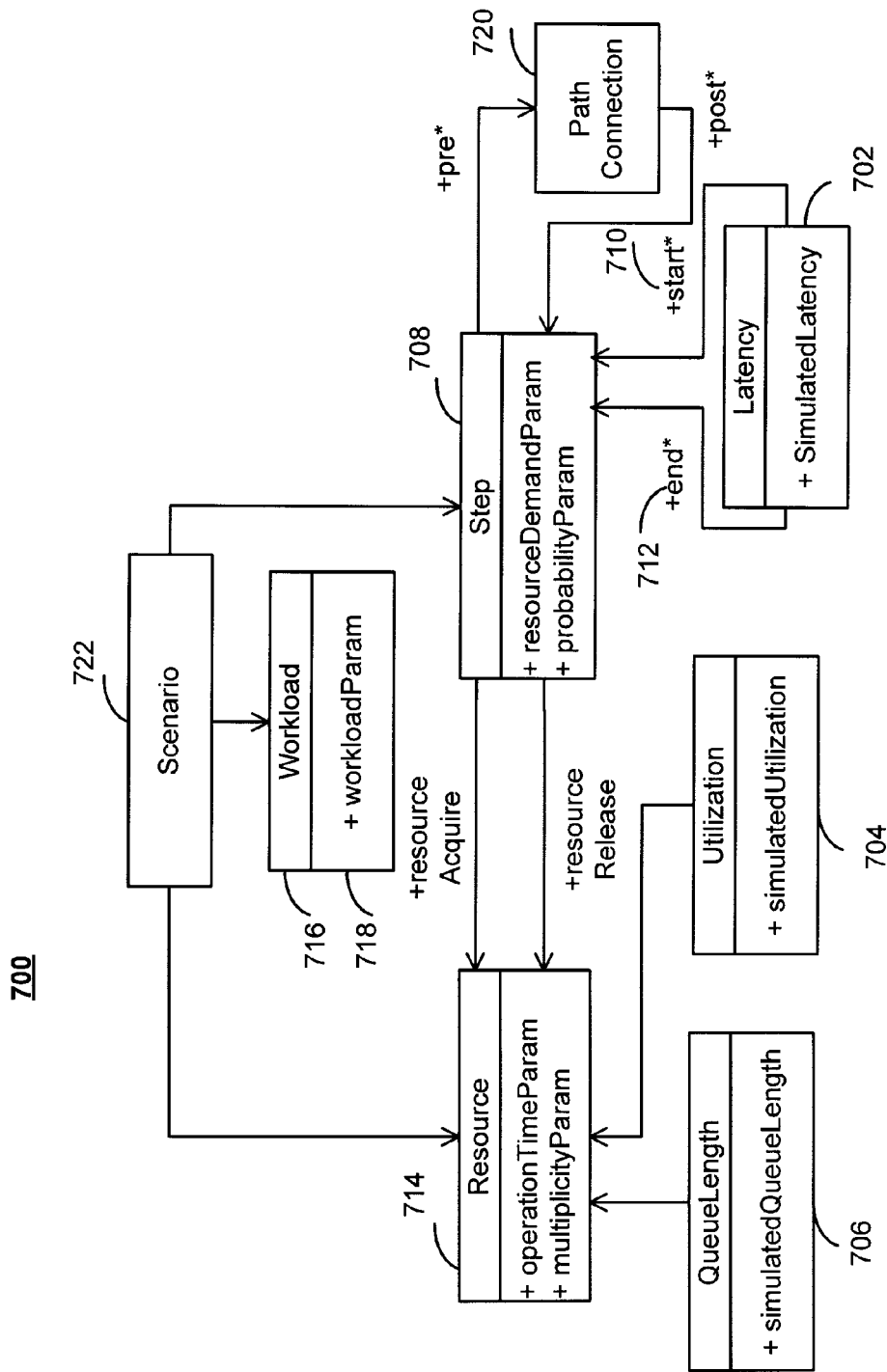
FIG. 7 is a block diagram illustrating a structure of an example, simplified generic performance analysis model implemented as a tool-independent performance model (TIPM).

FIG. 7 is a block diagram illustrating a structure of an example, simplified generic performance analysis model 700 implemented as a tool-independent performance model (TIPM). A TIPM may be distinguished as having two parts. One part contains monitors as shown in the lower part of FIG. 7. Monitors may be filled based on assessment results of the analysis. As shown in FIG. 7, examples of such monitors may include Latencies 702, Utilization 704, and QueueLength 706. The Latency monitor 702 may specify a time required in a simulation between two Steps 708 (e.g., determined by a start 710 and end 712 in FIG. 7). The example monitors Queue-Length 706 and Utilization 706 may be filled with the queuing behavior of simulated Resources 714.

The upper part of the TIPM meta-model 700 of FIG. 7 needs to be filled before a performance analysis may be executed by a performance analysis engine 608 (e.g., performance analysis engines 130a, 130b of FIG. 1). This part of the TIPM 700 combines the behavioral information from service models 612 (e.g., models 104a, 104b, 104c of FIG. 1) with performance parameters 610 (e.g., performance parameters 122 of FIG. 1). For example, a Workload 716 may include workload parameters 718. The example behavioral information is illustrated in the TIPM of FIG. 7 as a graph with Steps 708 (i.e., nodes) and PathConnections 720, which are used to interconnect the Steps 708.

Performance parameters may be represented in the TIPM 700 as attributes of other meta-classes. For instance, the parameter multiplicity may indicate how many units are available in a pool of resources, e.g., 10 employees in a Philadelphia sales office. Performance parameters may also be used to create example Scenarios 722 in the TIPM 700. An example for such a Scenario 722 is the execution of the previously introduced service composition of the Wine Seller of FIG. 5 for a certain sales unit in Philadelphia. Resources 714 may be shared among multiple Scenarios 722, as shown in FIG. 7. For example, ten employees for marketing may be shared between the sales unit in Philadelphia and in Chicago. For this specific case, the TIPM 700 may include the service composition associated with FIG. 5 twice, but the marketing resources only once. Scenarios 722 may also be used to simulate resource sharing situations between different service compositions.

An example abstraction of the different service specification/modeling languages which are employed by different service environments, such as BPM tools, is discussed in more detail below.

The example transformation from service composition specifications and performance parameters to the example TIPM 700 may be complex, as the structure of the TIPM meta-model is different from the meta-model structure of the service composition specification/modeling languages, as service specifications normally express behavior whereas the TIPM additionally expresses Scenarios 722 and Resources 715, and their related associations. However, the structures of the service composition specification/modeling languages, such as BPMN, UML Activity Diagrams, etc., are related as they are normally closely related to Petri-nets.

Therefore, it is sufficient to add a Petri-net like behavior modeling language as an Exchange Model in the model transformation chain 602, 108 in order to save development effort. This model, therefore, abstracts the different specification/modeling languages, which are used by the different chunks within the service compositions existing in varying service environments, and provides an end-to-end performance representation.

Since UML Activity Diagrams are broadly used to model Petri-net like behavior, this modeling language may be employed as an example exchange modeling language. Thus, if a new modeling tool is added, the required transformation will be less complex than in a case when a TIPM has to be generated directly, as an already available complex UML-to-TIPM transformation may be reused. This also helps avoiding investment of significant duplicated effort in implementing the similar functionality of transforming from Petri-net like behavior model to a TIPM.

Thus, an example combination of UML and TIPM may be used for implementation of the system of FIG. 1 in order to abstract service specification languages, offered by different BPM Tools, and Performance Analysis. Thus, the example TIPM and UML may enable performance related decision support for service compositions spanning across multiple service environments.

The example performance assessment data may be used as one input for an example transformation called GenericPerfModel2AnalysisModel, which is shown in FIG. 6 as the third transformation step 626, 124 within the illustrated transformation chain 602, 108. Moreover, the included information, such as performance requirements for a certain service (e.g., process step) within a service composition, may need to reference the generic performance analysis model 606, which may be implemented as a TIPM. Thus, this information may be annotated to the TIPM as illustrated in FIG. 7. In the MDPE Workbench shown in FIG. 6, such annotation may be implemented via specific annotation models, which may have references to target models.

However, in order to achieve a practical solution in terms of usability, the performance assessment data may be provided to a domain expert in terms of the vocabulary (i.e., language) he/she understands. The user, not being a performance expert, should not be required to have technical knowledge regarding the pure performance analysis models, such as the TIPM 700. Thus, the annotation models, which include the performance assessment data, may reference the service composition specification used as input for the first transformation step 614, 114. Further, since the annotated information may only be needed for the third transformation step 626, 124 of the transformation chain 602, 108, the transformations that do not require access to the annotated information, such as the transformation from service composition specification to UML, should not be polluted with the annotated information. Therefore, an example technique may keep model annotations independent of the model transformation chain 602, 108. Hence, a desirable example solution may enable annotating information at one step in an automated transformation chain, and using it in another step without polluting intermediate steps.

Further, management of different transformations between service environments and performance analysis tools may enable easy and quick extensibility with regards to different service composition and management tooling and performance analysis tooling without investing high development effort.

Additionally, in order to achieve a practical solution in terms of usability, a visualization of the performance assessment based on the original service specifications may be desired. It is, therefore, desirable to automatically trace the performance analysis results, e.g., performance simulation results, etc., back to the original service specifications/modeling languages 104*I*, 104*b*, 104*c* used as input for the model transformation chain 108. Trace models may be generated for each model transformation, but it may be difficult to store links to trace models within models taking part in a transformation chain. Therefore, a desirable approach enables navigation from models in the transformation chain to their related trace models. It may be possible to iterate all trace models, resolving the links and determining whether they are targeting the needed model(s). This is, however, not a systematic approach. An example systematic solution manages all the involved relationships in a centralized manner, as discussed further below. Thus, the MDPE transformation chain triggers a need to globally manage the tracing, transformation and annotation relationships.

For example, the modeling relationships used in MDPE may be represented in a separate model (e.g., a megamodel 630 as shown in FIG. 6) in order to deal with these issues.

Figure 8:
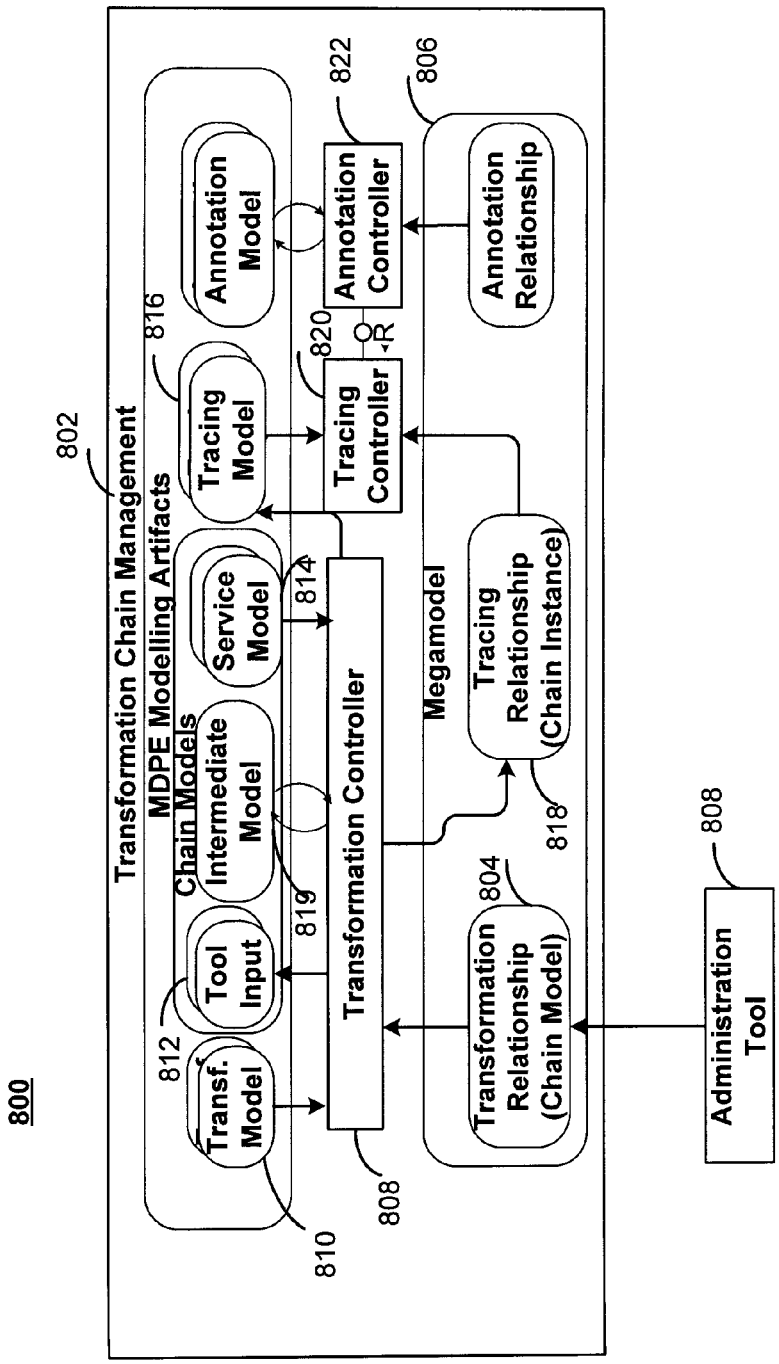
FIG. 8 is a block diagram of an example transformation chain management for a MDPE Workbench.

FIG. 8 is a block diagram of an example transformation chain management 802 for a MDPE Workbench. As shown in the example of FIG. 8, a transformation relationship 804 is set in an example megamodel 806 (e.g., M2M navigation model 144 of FIG. 1) by a MDPE administration tool 808. The tool 808 enables users to select currently active service specification adaptors 114 and performance analysis adaptors 124. The administration tool 808, therefore, stores the currently active transformation chain 108 into the megamodel 806. This specification is input to a transformation controller 808, which executes the different transformation models 810 and outputs the final tool input 812 (e.g., 128*a*, 128*b*) for performance analysis tools 130*a*, 130*b* based on a number of service models 814. The transformation outputs a number of trace models 816 (e.g., 140, 142) as by-products of the transformation. The transformation controller 808 also sets tracing relationships 818 between original service specifications 104, intermediate models 819 (e.g. the TIPM, 116, 118, 120) and the final tool input 128 for the performance analysis tool 130 into the megamodel 806.

The tracing relationships 818 are input to a tracing controller 820 (e.g., tracing manager 134 of FIG. 1), which relates elements of one transformation step in the model transformation chain 108 with elements of another step. As shown in FIG. 8, an "R" is shown between the tracing controller 820 and an annotation controller 822. This functionality may be utilized by the annotation controller 822 (e.g., annotation tool 132) in case the performance assessment results 126, which are associated with the tool input model 128 at the end of the model transformation chain 108, need to be set as annotation of the original service specifications. Thus, the performance assessment may be traced backward through the chain 108, and the megamodel 806 (M2M navigation model 144) maintains model annotations independent of the model transformation chain 108.

Figure 9:
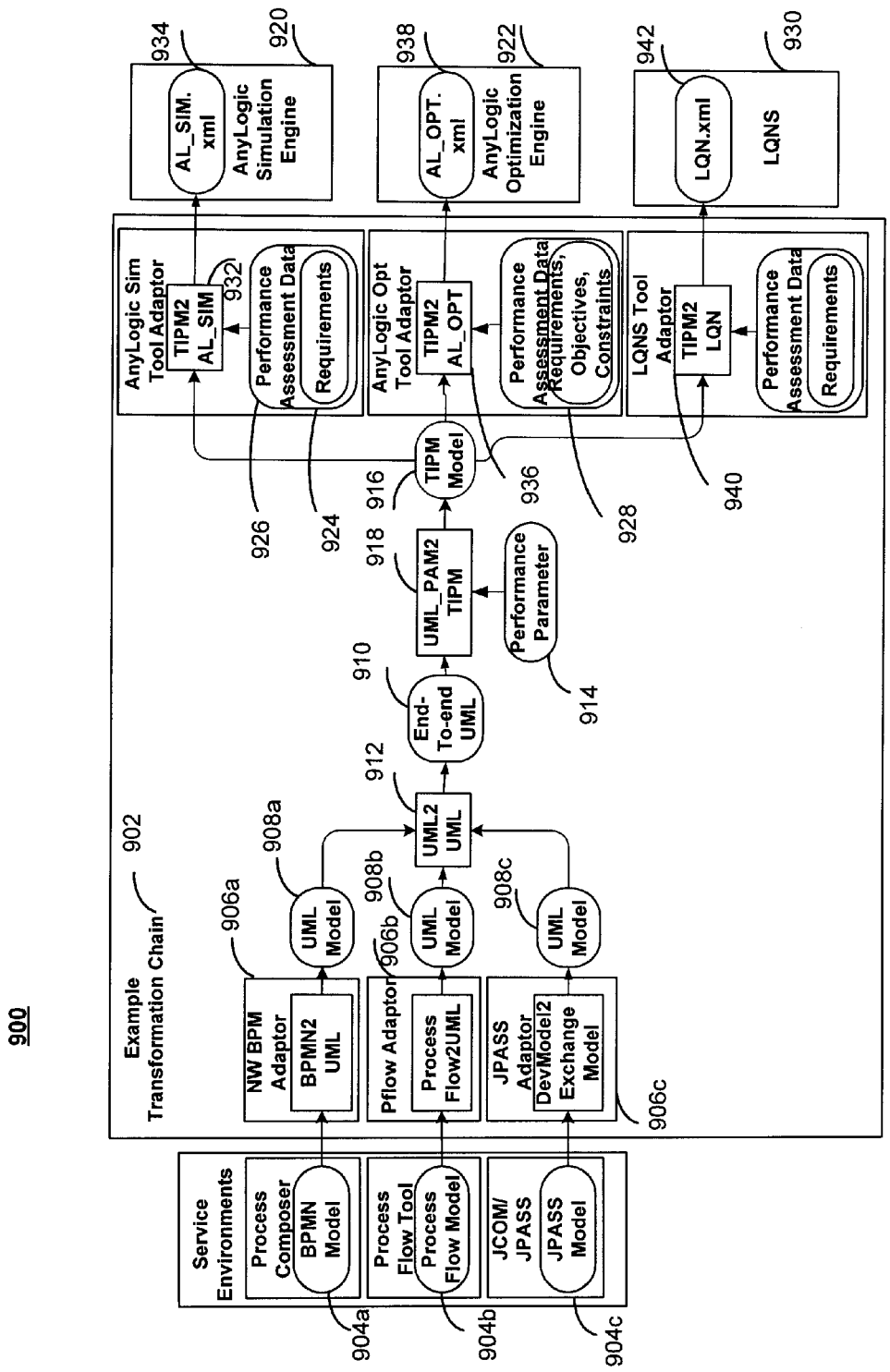
FIG. 9 is a block diagram of an example model transformation chain.

FIG. 9 is a block diagram of an example model transformation chain 902 of the system of FIG. 1. The example model transformation chain 902 (e.g., the model transformation chain 108) shown in FIG. 9 takes three different types of process modeling languages 904 as input, which provide the end-to-end process described previously. All three modeling languages are first transformed to UML by a BPMN2 UML adaptor 906*a*, a ProcessFlow2 UML adaptor 906*b*, and a JPASS2 UML adaptor 906*c*, which transform a BPMN model 904*a*, a process flow model 904*b*, and a JPASS model 904*c*, respectively, into corresponding UML models 908*a*, 908*b*, 908*c*, respectively. In a second step, the three UML models 908 are inter-connected to an end-to-end UML model 910 (e.g., the composed unified development model 118) via a UML2 UML transformation engine 912 (e.g., the transformation engine 111). The end-to-end UML model 910 is then, together with performance parameters 914, transformed to a TIPM 916 (e.g., the composed unified performance analysis model 120) via a UML_OAM2 TIPM transformation engine 918 (e.g., the transformation engine 112).

Three different types of performance related decision support are provided by the example of FIG. 9. The example AnyLogic tool is used as a discrete event simulation engine 920 and as an optimization engine 922. The required transformations are different for both cases as different kinds of experiments need to be created in the AnyLogic tool. Further, the simulation based decision support only takes performance requirements 924 into account as performance assessment data 926, whereas the optimization also considers objectives and constraints 928. Additionally, a LQNS tool 930 is included to obtain analytic support for performance related decisions, for example, in situations that may involve bottleneck related questions or parameter sensitivity related questions. Therefore, the TIPM 916, which contains the end-to-end business process including its resource related behavior, may be transformed via a representation independent model (e.g., via an AL_SIM tool adaptor 932) into tool input (e.g., an ALSIM.xml 934 model as tool input for the AnyLogic Simulation Engine 920).

The TIPM 916 may also be transformed, via a TIPM2 AL_OPT tool adaptor 936, into an AL_OPT.xml 938 model as tool input for the AnyLogic Optimization Engine 922. Additionally, the TIPM 916 may be transformed, via a TIPM2 LQN tool adaptor 940, into an LQN.xml 942 model as tool input for the LQNS performance analysis engine 930.

Figure 10:
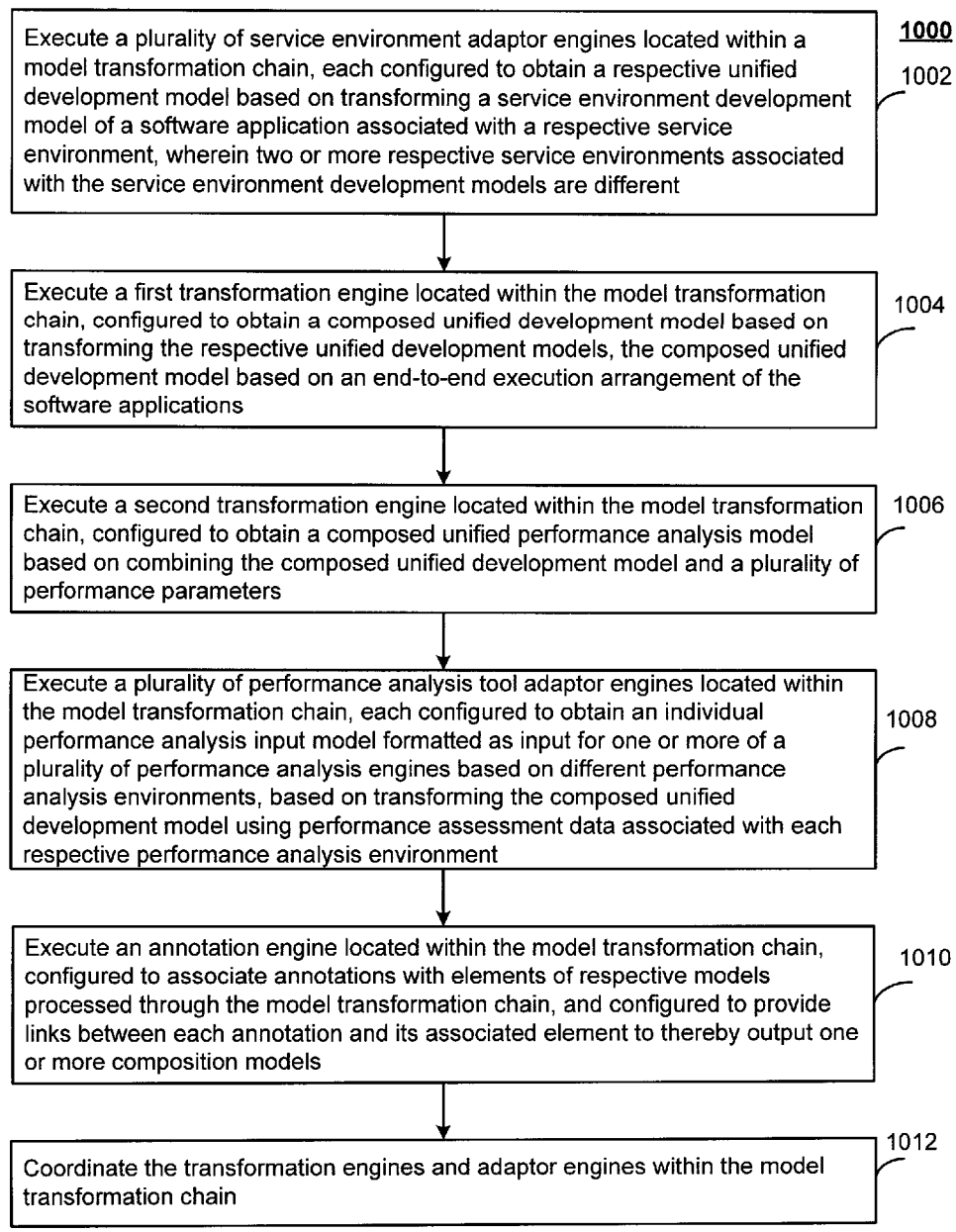
FIG. 10 is a flowchart illustrating example operations of the system of FIG. 1.

FIG. 10 is a flowchart 1000 illustrating example operations of the system of FIG. 1, FIG. 6, and FIG. 9. In the example of FIG. 10, a plurality of service environment adaptor engines located within a model transformation chain may be executed. Each service environment adaptor engine may be configured to obtain a respective unified development model based on transforming a service environment development model of a software application associated with a respective service environment, wherein two or more respective service environments associated with the service environment development models are different (1002).

For example, the service environment adaptor engines 114a, 114b, 114c of FIG. 1 may input the development models 104a, 104b, 104c or 116a, 116b, 116c and obtain respective unified development models 116a, 116b, 116c, based on transforming the service environment development models, as discussed previously.

A first transformation engine located within the model transformation chain may be executed. The first transformation engine may be configured to obtain a composed unified development model based on transforming the respective unified development models, the composed unified development model based on an end-to-end execution arrangement of the software applications (1004).

For example, in FIG. 1, the transformation engine 111 (or the M2M engine 614 of FIG. 6) may obtain the composed unified development model 118 (or the generic process model 616 of FIG. 6) based on transforming the respective unified development models 116a, 116b, 116c, the composed unified development mode 1181 based on an end-to-end execution arrangement of the software applications.

A second transformation engine located within the model transformation chain may be executed. The second transformation engine may be configured to obtain a composed unified performance analysis model based on combining the composed unified development model and a plurality of performance parameters (1006).

For example, the transformation engine 112 or M2M engine 618 of FIG. 6 may be configured to obtain the composed unified performance analysis model 120 (or generic performance analysis model 606 of FIG. 6) based on combining the composed unified development model 118, 616 and a plurality of performance parameters 122, 610, as discussed previously.

A plurality of performance analysis tool adaptor engines located within the model transformation chain may be executed. Each performance analysis tool adaptor engine may be configured to obtain an individual performance analysis input model formatted as input for one or more of a plurality of performance analysis engines based on different performance analysis environments, based on transforming the composed unified development model using performance assessment data associated with each respective performance analysis environment (1008).

For example, the performance analysis tool adaptor engines 124a, 124b, 626 may each be configured to obtain an individual performance analysis input model 128a, 128b, 628 formatted as input for one or more of the performance analysis engines 130a, 130b, 608 based on different performance analysis environments, based on transforming the composed unified performance analysis model 120, 606 using performance assessment data 126a, 126b associated with each respective performance analysis environment, as discussed previously.

An annotation engine located within the model transformation chain may be executed. The annotation engine may be configured to associate annotations with elements of respective models processed through the model transformation chain, and configured to provide links between each annotation and its associated element to thereby output one or more composition models (1010).

For example, in FIG. 1, the annotation engine 132 may be configured to associate annotations with elements of respective models processed through the model transformation chain 108, and may be configured to provide links between each annotation and its associated element to thereby output one or more composition models 133.

The transformation engines and adaptor engines within the model transformation chain may be coordinated (1012).

For example, the model transformation manager 110 may be configured to coordinate transformation engines 111, 112, 614, 618 and adaptor engines 114a, 114b, 114c, 124a, 124b, 614, 626 within the model transformation chain 108, 602.

As referenced above, some implementations may include simple simulations in which, for example, a performance of the development model(s) is tested and results are determined, such as whether the process will complete in the desired amount of time and with the available amount of resources. In other examples, decision support may additionally be provided, in which, when the simulation determines that the relevant performance parameters will not be met, a user may be provided with options and information as to whether and how to alter the development model so as to obtain the desired performance results (e.g., to allocate more resources to a particular task/node of the development model).

From a functional point of view, the combination of TIPM and UML as example intermediate languages enables abstraction of different process modeling languages. Without the transformation chain discussed with regard to the examples shown herein, the creation of end-to-end simulation models may require a developer or user to manually switch between three different process modeling tools and three different performance analysis engines. Thus, if a user desires end-to-end decision support for example scenarios such as those discussed herein, nine different tools may need to be understood by the user.

More generally, for end-to-end decision support spanning across n BPM environments and m performance analysis tools, n*m tools need to be understood by a domain specialist. In determining the complexity of using a tool, one example measure is the number of manual steps; another measure is number of context switches. The example solutions discussed herein reduce the number of manual steps to a "push-the-button" activity and a user is not required to switch between numerous tools involved.

By using UML as an example generic process model, or other similar techniques, the complex part of the transformation between process modeling languages and TIPM only needs to be written once. Thus, UML effectively reduces the development effort associated with attaching different process modeling tools.

Additionally, use of the TIPM as a Generic Performance Analysis Model also enables users to provide decision support based on multiple Performance Analysis Engines, such as the analytic LQNS tool and the simulation engine Any-Logic. In case a new Process Modeling Tool is attached to the MDPE Workbench, the existing transformations between TIPM and Performance Analysis Tools may be reused.

Moreover, the Transformation Chain Management enables users to manage the different modeling artifacts, such as annotation models and process models, across the transformation chain. This enables users to use, for example, annotation models that reference the process models at any step in the transformation chain, and by tracing assessment results backwards through the chain in order to visualize them, also as annotation models, based on the original process models. Adding a new step to the transformation chain is therefore no longer an issue. This was, for example, needed when to added the UML2UML transformation step 912 of FIG. 9. The additional transformation step was one prerequisite in order to realize end-to-end decision support which spans across tool chain build by the Process Flow tool, Process Composer and the JPASS tool.

In general, model-driven performance engineering (MDPE) may be defined as an application of MDE enabling performance engineering based on development models and additional performance related data, e.g., annotations related to resource demands of steps, branch probabilities and factors due to contention for resources. Multiple tools are supported that enable multiple performance prediction techniques. For example, system(s) of FIGS. 1 and/or 9 may use AnyLogic Simulation Models as input for performance prediction tools.

Hence, MDPE utilizes MDE concepts. In order to support multiple types of development models and multiple performance prediction techniques and reduce the number of required transformations, MDPE may use, as referenced above, Tool Independent Performance Models (TIPMs). Such use of TIPMs enables handling not only of proprietary modeling languages but also with well known modeling languages, such as UML. Additionally, tool independence may be of high value for business software vendors, in order to not be dependent on one specific simulation tool when simulating performance results. An example of the TIPM meta-model has been defined as a refined and slightly extended version of the Core Scenario Model (CSM). The TIPM focuses on behavior information, available resources, and consumption of resources. It can be refined by annotating stepwise performance related information, such as, for example, resource demands, branch probabilities, and/or factors due to contention for resources).

In the model transformation chain 108 of FIG. 1, a first transformation engine 111 may use the ATLAS Transformation Language (ATL) to transform the development model 104 into a UML model 116, which may thus be seen as a transformed model of the transformation engine 111 and an input model of the next transformation engine 112, also using the ATL. Specifically, in order to automatically transform the UML model 118 to a TIPM 120, the ATL may be used to perform a transformation between the relevant UML meta-model and the relevant TIPM meta-model.

Then, a transformation engine may be used to transform the TIPM into a tool-specific performance model (TSPM) such as an AnyLogic model 934 referenced above that is suitable for the Simulation Tool AnyLogic from XJTech, which may be used to provide a simulation model as simulation results. From such a simulation based on the UML representation of the business process, it is possible to predict, for example, the throughput time for a Sales Order, or the utilization for each department for the Wine Seller.

In more detail, the transformation engine 918, in transforming the UML model 910 into the TIPM 916, may access a composition model 133 referenced as a performance parameter composition model within a composition environment. As may be appreciated from the above, the annotation tool 132 may use the PAM package of the MARTE profile, together with historical data 136 and assumed performance parameters/values to create the model 916.

It will be appreciated from the description of FIG. 1 that each of the transformation engines may be associated with a trace or tracing model, and that the tracing manager 134 of FIG. 1 may use a M2M navigation model (such as model 144) to navigate from elements of models at the end of the transformation chain to elements at the beginning, as described herein.

As discussed herein, the combination of a model transformation chain and a transformation chain manager may provide end-to-end performance related decision support for service compositions spanning across multiple Service Environments, for example, BPM tools. The example architecture further provides interconnection of arbitrary service environments with a number of diverse performance analysis tools.

As referenced above, some implementations may include simple simulations in which, for example, a performance of the development model(s) is tested and results are determined, such as whether the process will complete in the desired amount of time and with the available amount of resources. In other examples, decision support may additionally be provided, in which, when the simulation determines that the relevant performance parameters will not be met, a user may be provided with options and information as to whether and how to alter the development model so as to obtain the desired performance results (e.g., to allocate more resources to a particular task/node of the development model).

As described, the performance evaluation engine 150, or the transformation engine 112 may need to relate elements of a simulation or other transformation and relate these elements to the original elements of the source/development model(s). Hence, a mechanism is needed in order to associate the model annotations done based on original Source Models with the result of the possibly long transformation chain. This information may be obtained, for example, by implementing the following algorithm:

Algorithm 1

```
main( ){
Array<Annotation> annotations =
getAllAnnotationsFromCompositionModel( );
for(Annotation currentAnnotation : annotations){
SourceModelElement sElement =
getSourceModelElementOfAnnotation
(currentannotation);
TargetElement tElement =
getTargetElementAfterTransformationChain
ForSourceElement(sElement, currentModel);
//Now, the annotation can be associated with a target model
//element after a Transformation Chain.
}
//recursive method is going through the trace models in the
//Transformation Chain
ModeElement
getTargetElementAfterTransformationChainForSourceElement
(ModelElement sourceElement, Model currentModel){
TracingModel tModel =
getTracingModelOfModelFromM2MNavigationModel
(sourceElement.getParentModel( ));
ModelElement targetModelElement =
tModel.getTargetElementFromSource
Element(sourceElement);
```

-continued

Algorithm 1

```
If(targetModelElement.getParentModel( ) typeof currentModel)
    return targetModelElement;
else
    return
    getTargetElementAfterTransformationChainForSourceElement
    (targetModelElement, currentModel);
}
```

In general, Algorithm 1 provides for a recursive technique in which simulation results are related back to the development models using a recursive techniques and "back-tracking" through the various trace models, using the M2M navigation model 144 or megamodel 806, as shown in Algorithm 1. When using an ATL transformation this code may be embedded in the functional part of ATL code in case "back-tracking" is needed. In other cases, such as in the engine(s) 150 Algorithm 1 may be written, for example, as Java code.

The algorithm above can also be used in order to generate a direct trace model between an assessment model, e.g. storing simulation or optimization results, and development model elements needs to be generated.

The algorithm provides for associating the annotations defined based on the Source Models with the target models after a possibly long transformation chain. The algorithm may thus be useful in case a related target model element is available for the annotated source model element. If this is not the case, then a user (as a modeling domain specialist) may be informed, for example, using a GUI that the annotation will not be useful for the purpose(s) of the user.

As described, the techniques of the present description may be provided to enable users to only compute the annotated information for those steps in a Transformation Chain where the annotated data are needed, and to relate that data back to the original development/source model, as needed.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
executing a plurality of service environment adaptor engines located within a model transformation chain linking multiple development models of software applications that utilize different service environments, the model transformation chain configured to generate a composed unified performance analysis model for evaluating the multiple development models, each of the plurality of service environment adaptor engines configured to obtain a respective unified development model based on transforming a service environment development model of a software application associated with a respective service environment, wherein two or more respective service environments associated with the service environment development models are different;
executing a first transformation engine located within the model transformation chain, configured to obtain a composed unified development model based on transforming the respective unified development models, the composed unified development model based on an end-to-end execution arrangement of the software applications;
executing a second transformation engine located within the model transformation chain, configured to obtain the composed unified performance analysis model based on combining the composed unified development model and a plurality of performance parameters;
executing a plurality of performance analysis tool adaptor engines located within the model transformation chain, each configured to obtain an individual performance analysis input model formatted as input for one or more of a plurality of performance analysis engines based on different performance analysis environments, based on transforming the composed unified development model using performance assessment data associated with each respective performance analysis environment;
executing an annotation engine located within the model transformation chain, configured to associate annotations with elements of respective models processed through the model transformation chain, and configured to provide links between each annotation and its associated element to thereby output one or more composition models; and
coordinating the transformation engines and adaptor engines within the model transformation chain.

2. The method of claim 1 wherein the coordinating comprises:
transforming the plurality of development models, or subsequent transformations thereof, into one or more transformed development models and performance analysis models, and coordinating processing within the model transformation chain to transform the one or more performance analysis models, or subsequent transformations thereof, into transformed performance analysis models, and coordinating processing within the model transformation chain to provide a unified performance analysis assessment associated with the end-to-end execution arrangement of the software applications, based on the development models and the one or more performance analysis models.

3. The method of claim 1 comprising:
executing an evaluation engine configured to receive the composed unified performance analysis model and an output model of the transformation chain, and configured to determine a relation of the output model to a selected one of the service environment development models for evaluation of the selected service environment development model therewith.

4. The method of claim 3 wherein the evaluation engine is configured to determine the relation using a plurality of trace models, each trace model being associated with one of the transformation engines and relating source elements of a corresponding input model thereof to target elements of a corresponding transformed model.

5. The method of claim 1 wherein at least one of the performance analysis engines is configured to perform analytical sensitivity analysis.

6. A computer system comprising:
a processor;
a memory; and
a model transformation chain linking multiple development models of software applications that utilize different service environments, the model transformation chain configured to generate a composed unified performance analysis model for evaluating the multiple development models, the model transformation chain including:
a plurality of service environment adaptor engines, each of which is configured to obtain a respective unified development model based on transforming a service environment development model of a software application associated with a respective service environment, wherein two or more respective service environments associated with the service environment development models are different from each other;
a first transformation engine configured to obtain a composed unified development model based on transforming the respective unified development models, the composed unified development model based on an end-to-end execution arrangement of the software applications;
a second transformation engine configured to obtain the composed unified performance analysis model based on combining the composed unified development model and a plurality of performance parameters; and
a plurality of performance analysis tool adaptor engines, each configured to obtain an individual performance analysis input model formatted as input for one or more of a plurality of performance analysis engines based on different performance analysis environments, based on transforming the composed unified development model using performance assessment data associated with each respective performance analysis environment;
an annotation engine configured to associate annotations with elements of respective models processed through the model transformation chain, and configured to provide links between each annotation and its associated element to thereby output one or more composition models; and
a model transformation manager configured to coordinate transformation engines and adaptor engines within the model transformation chain.

7. The computer system of claim 6 wherein the model transformation manager is configured to transform the plurality of development models, or subsequent transformations thereof, into one or more transformed development models and performance analysis models, and to coordinate processing within the model transformation chain to transform the one or more performance analysis models, or subsequent transformations thereof, into transformed performance analysis models, and to coordinate processing within the model transformation chain to provide a unified performance analysis assessment associated with the end-to-end execution arrangement of the software applications, based on the development models and the one or more performance analysis models.

8. The computer system of claim 6 comprising:
an evaluation engine configured to receive the composed unified performance analysis model and an output model of the transformation chain, and configured to determine a relation of the output model to a selected one of the service environment development models for evaluation of the selected service environment development model therewith.

9. The computer system of claim 8 wherein the evaluation engine is configured to determine the relation using a plurality of trace models, each trace model being associated with one of the transformation engines and relating source elements of a corresponding input model thereof to target elements of a corresponding transformed model.

10. The computer system of claim 9 wherein the evaluation engine is configured to use the plurality of trace models to determine the relation by using a model-to-model (M2M)

navigation model to track associations between the trace models and their respective transformation engines.

11. The computer system of claim 8 wherein the annotations include performance-related annotations, and wherein the evaluation engine includes a simulator configured to output a performance simulation of the output model in which elements of the output model are related to elements of a corresponding development model for providing performance-related information about at least some of the elements of the corresponding development model.

12. The computer system of claim 11 wherein the evaluation engine includes a performance assessment engine that is configured to receive decision support models for use in providing decision support in potential modifications of the elements of the corresponding development model during the performance simulation.

13. The computer system of claim 6 wherein at least one of the performance analysis engines is configured to perform analytical sensitivity analysis.

14. A computer program product tangibly embodied on a non-transitory computer-readable medium and including executable code that, when executed, is configured to cause at least one data processing apparatus to:
execute a plurality of service environment adaptor engines located within a model transformation chain linking multiple development models of software applications that utilize different service environments, the model transformation chain configured to generate a composed unified performance analysis model for evaluating the multiple development models, each of the plurality of service environment adaptor engines configured to obtain a respective unified development model based on transforming a service environment development model of a software application associated with a respective service environment, wherein two or more respective service environments associated with the service environment development models are different;
execute a first transformation engine located within the model transformation chain, configured to obtain a composed unified development model based on transforming the respective unified development models, the composed unified development model based on an end-to-end execution arrangement of the software applications;
execute a second transformation engine located within the model transformation chain, configured to obtain the composed unified performance analysis model based on combining the composed unified development model and a plurality of performance parameters;
execute a plurality of performance analysis tool adaptor engines located within the model transformation chain, each configured to obtain an individual performance analysis input model formatted as input for one or more of a plurality of performance analysis engines based on different performance analysis environments, based on transforming the composed unified development model using performance assessment data associated with each respective performance analysis environment; and
execute an annotation engine located within the model transformation chain, configured to associate annotations with elements of respective models processed through the model transformation chain, and configured to provide links between each annotation and its associated element to thereby output one or more composition models; and
coordinate the transformation engines and adaptor engines within the model transformation chain.

15. The computer program product of claim 14 wherein coordinating the transformation engines and adaptor engines comprises:
transforming the plurality of development models, or subsequent transformations thereof, into one or more transformed development models and performance analysis models, and coordinating processing within the model transformation chain to transform the one or more performance analysis models, or subsequent transformations thereof, into transformed performance analysis models, and coordinating processing within the model transformation chain to provide a unified performance analysis assessment associated with the end-to-end execution arrangement of the software applications, based on the development models and the one or more performance analysis models.

16. The computer program product of claim 14 wherein the executable code, when executed, is configured to cause the at least one data processing apparatus to:
execute an evaluation engine configured to receive the composed unified performance analysis model and an output model of the transformation chain, and configured to determine a relation of the output model to a selected one of the service environment development models for evaluation of the selected service environment development model therewith.

17. The computer program product of claim 16 wherein the evaluation engine is configured to determine the relation using a plurality of trace models, each trace model being associated with one of the transformation engines and relating source elements of a corresponding input model thereof to target elements of a corresponding transformed model.

18. The computer program product of claim 17 wherein the evaluation engine is configured to use the plurality of trace models to determine the relation by using a model-to-model (M2M) navigation model to track associations between the trace models and their respective transformation engines.

19. The computer program product of claim 16 wherein the annotations include performance-related annotations, and wherein the evaluation engine includes a simulator configured to output a performance simulation of the output model in which elements of the output model are related to elements of a corresponding development model for providing performance-related information about at least some of the elements of the corresponding development model.

20. The computer program product of claim 14 wherein at least one of the performance analysis engines is configured to perform analytical sensitivity analysis.

* * * * *